(12) United States Patent
Ford et al.

(10) Patent No.: US 11,954,603 B1
(45) Date of Patent: Apr. 9, 2024

(54) PREDICTOR NEUTRALIZATION IN PREDICTIVE DATA ANALYSIS SYSTEMS

(71) Applicant: LIBERTY MUTUAL INSURANCE COMPANY, Boston, MA (US)

(72) Inventors: Patrick Ford, Seattle, WA (US); Brian Ironside, Renton, WA (US)

(73) Assignee: LIBERTY MUTUAL INSURANCE COMPANY, Boston, MA (US)

( * ) Notice: Subject to any disclaimer, the term of this patent is extended or adjusted under 35 U.S.C. 154(b) by 1029 days.

(21) Appl. No.: 16/850,630

(22) Filed: Apr. 16, 2020

Related U.S. Application Data

(60) Provisional application No. 62/842,859, filed on May 3, 2019.

(51) Int. Cl.
*G06N 5/02* (2023.01)
*G06N 20/00* (2019.01)

(52) U.S. Cl.
CPC .............. *G06N 5/02* (2013.01); *G06N 20/00* (2019.01)

(58) Field of Classification Search
CPC ................................. G06N 5/02; G06N 20/00
See application file for complete search history.

(56) References Cited

U.S. PATENT DOCUMENTS

| | | |
|---|---|---|
| 5,353,207 A | 10/1994 | Keeler et al. |
| 5,526,281 A | 6/1996 | Chapman et al. |
| 2009/0024546 A1 | 1/2009 | Ficcaglia et al. |
| 2015/0379423 A1 | 12/2015 | Dirac et al. |
| 2017/0161105 A1 | 6/2017 | Barrett et al. |
| 2017/0169336 A1 | 6/2017 | Singhal et al. |
| 2018/0349795 A1 | 12/2018 | Boyle et al. |
| 2019/0025810 A1 | 1/2019 | Chapin et al. |
| 2019/0043070 A1 | 2/2019 | Merrill et al. |

FOREIGN PATENT DOCUMENTS

WO 2018/129413 A1 7/2018

OTHER PUBLICATIONS

Zhang, Hongyi, et al. "mixup: Beyond empirical risk minimization." arXiv preprint arXiv:1710.09412 (2017). (Year: 2017).*

(Continued)

*Primary Examiner* — Brian M Smith
(74) *Attorney, Agent, or Firm* — ALSTON & BIRD LLP

(57) ABSTRACT

There is a need for more effective and efficient predictive data analysis. Various embodiments of the present invention address one or more of the noted technical challenges. In one example, a method for generating a neutralized prediction model includes accessing an initial prediction model generated using an initial training data object, performing a randomized shuffling of the initial training data object to generate a shuffled training data object, generating randomized predictions by processing the shuffled training data object using the initial prediction model, performing a neutralization of the initial training data object to generate a neutralized training data object, and generating the neutralized prediction model based at least in part on the neutralized training data object and the randomized predictions.

20 Claims, 27 Drawing Sheets

(56) References Cited

OTHER PUBLICATIONS

Ba, Jimmy, and Rich Caruana. "Do deep nets really need to be deep?. " Advances in neural information processing systems 27 (2014). (Year: 2014).*

Bergasa, Luis M., et al. "Drivesafe: An app for alerting inattentive drivers and scoring driving behaviors." 2014 IEEE Intelligent Vehicles symposium proceedings. IEEE, 2014. (Year: 2014).*

Huang, Shaoli, Xinchao Wang, and Dacheng Tao. "Stochastic partial swap: Enhanced model generalization and interpretability for fine-grained recognition." Proceedings of the IEEE/CVF International Conference on Computer Vision. 2021. (Year: 2021).*

Gregorutti, B. et al., "Correlation and variable importance in random forests," Stat Comput vol. 27 (Mar. 23, 2016) pp. 659-678. (Year: 2016).*

Kamiran, F. et al., "Classifying without discriminating," 2009 2nd Intl. Conf. on Computer, Control, and Communication (May 5, 2009) 6 pp. (Year: 2009).*

Gay, Gregory et al. Automatically Finding the Control Variables for Complex System Behavior, Automated Software Engineering. Dec. 1, 2010, vol. 17, No. 4, (33 pages).

Pope, Devin G. et al. "Implementing Anti-Discrimination Policies in Statistical Profiling Models," American Economic Journal: Economic Policy 3, vol. 3, No. 3, Aug. 2011, pp. 206-231.

Yu, Jungwon et al. "A Fault Isolation Method via Classification and Regression Tree-Based Variable Ranking for Drum-Type Steam Boiler in Thermal Power Plant," Energies, May 2018, vol. 11, No. 5:1142, pp. 1-19. DOI: 10.3390/en11051142.

Zhu, Zining et al. "Deconfounding Age Effects With Fair Representation Learning When Assessing Dementia," arXiv preprint arXiv:1807.07217v4 [cs.LG], Sep. 7, 2019.

\* cited by examiner

| Driver_ID | Has_Truck | Years_of_Driving | Residence_State | Risk_Score |
|---|---|---|---|---|
| 000001 | YES | 4 | TX | 0.13 |
| 000002 | YES | 3 | GA | 0.45 |
| 000003 | NO | 10 | CA | 0.68 |

| Driver_ID | Has_Truck | Years_of_Driving | Risk_Score |
|---|---|---|---|
| | 601 | 602 | 611 |
| 000001 | YES | 4 | 0.13 |
| 000002 | YES | 3 | 0.45 |
| 000003 | NO | 10 | 0.68 |

Thanks, POOYA! Next, vehicle info

To save you time we have looked up the vehicles associated with the address you provided. How did you find my vehicle(s)?

Choose the vehicles you would like to include in your quote:
Any checked vehicles will be included

- ☐ 2009 TOYOTA CAMRY
- ☐ 2000 BMW 325
- ☐ 2002 TOYOTA RAV4
- ☐ 1999 TOYOTA CAMRY

Would you like to add more vehicles?
○ Yes  ○ No

[Back]

A few more driver details

Driver 1 of 2
POOYA SHOGHI · 29 yrs

Phone Number
Your phone number is used only to process your quote, and provide policy, product and services information. Privacy Policy

Age First Licensed
16

Do you own your home?
In some states, owning a home may help you save. We'll also check if you can save by bundling auto and property insurance.
Select

Any accidents, violations, or auto insurance claims in the past 5 years?
Learn more
○ Yes  ● No

Has the driver completed a state-approved Defensive Driver Course within the last 3 years?
Completion of a state-approved Motor Vehicle Defensive Driver Course could qualify you for a discount. Verification will be required at the time of purchase.
○ Yes  ● No

FIG. 20

PREDICTOR NEUTRALIZATION IN PREDICTIVE DATA ANALYSIS SYSTEMS

CROSS REFERENCE TO RELATED APPLICATIONS

This application is a conversion of provisional U.S. Patent Application No. 62/842,859, titled "Concepts For Predictor Neutralization By Value Shuffling," filed on May 3, 2019, which is incorporated by reference herein in its entirety.

BACKGROUND

The present invention addresses technical challenges related to performing predictive data analysis in a computationally efficient and predictively reliable manner. Existing predictive data analysis systems are ill-suited to efficiently and reliably performing predictive data analysis in various domains, such as domains that are associated with dynamic input structures.

BRIEF SUMMARY

In general, embodiments of the present invention provide methods, apparatus, systems, computing devices, computing entities, and/or the like for performing predictor neutralization in predictive data analysis systems. Certain embodiments utilize systems, methods, and computer program products that perform predictive analysis using at least one of randomized shuffling of training data objects, neutralizations of training data objects, randomized predictions, neutralized prediction models, and isolated impact scores for control predictor variables.

In accordance with one aspect, a method is provided. In one embodiment, the method comprises: accessing an initial prediction model, wherein: (i) the initial prediction model is trained using an initial training data object, and (ii) the initial training data object comprises, for each training predictive entity of one or more training predictive entities, one or more control predictor variables, one or more predictor variables, and one or more response variables; performing a randomized shuffling of the initial training data object to generate a shuffled training data object, wherein the randomized shuffling of the initial training data object comprises assigning each control predictor variable of the one or more control predictor variables for a first training predictive entity of the one or more training predictive entities to a second training predictive entity of the one or more training predictive entities; generating, for each training predictive entity of the one or more training predictive entities, a randomized prediction by processing the shuffled training data object using the initial prediction model; performing a neutralization of the initial training data object to generate a neutralized training data object, wherein the neutralization of the initial training data object comprises removing each control predictor variable of the one or more control predictor variables for a training predictive entity of the one or more training predictive entities from the initial training data object; and generating the neutralized prediction model based at least in part on the neutralized training data object and each randomized prediction for each training predictive entity of the one or more training predictive entities.

In accordance with another aspect, a computer program product is provided. The computer program product may comprise at least one computer-readable storage medium having computer-readable program code portions stored therein, the computer-readable program code portions comprising executable portions configured to: access an initial prediction model, wherein: (i) the initial prediction model is trained using an initial training data object, and (ii) the initial training data object comprises, for each training predictive entity of one or more training predictive entities, one or more control predictor variables, one or more predictor variables, and one or more response variables; perform a randomized shuffling of the initial training data object to generate a shuffled training data object, wherein the randomized shuffling of the initial training data object comprises assigning each control predictor variable of the one or more control predictor variables for a first training predictive entity of the one or more training predictive entities to a second training predictive entity of the one or more training predictive entities; generate, for each training predictive entity of the one or more training predictive entities, a randomized prediction by processing the shuffled training data object using the initial prediction model; performing a neutralization of the initial training data object to generate a neutralized training data object, wherein the neutralization of the initial training data object comprises removing each control predictor variable of the one or more control predictor variables for a training predictive entity of the one or more training predictive entities from the initial training data object; and generate the neutralized prediction model based at least in part on the neutralized training data object and each randomized prediction for each training predictive entity of the one or more training predictive entities.

In accordance with yet another aspect, an apparatus comprising at least one processor and at least one memory including computer program code is provided. In one embodiment, the at least one memory and the computer program code may be configured to, with the processor, cause the apparatus to: access an initial prediction model, wherein: (i) the initial prediction model is trained using an initial training data object, and (ii) the initial training data object comprises, for each training predictive entity of one or more training predictive entities, one or more control predictor variables, one or more predictor variables, and one or more response variables; perform a randomized shuffling of the initial training data object to generate a shuffled training data object, wherein the randomized shuffling of the initial training data object comprises assigning each control predictor variable of the one or more control predictor variables for a first training predictive entity of the one or more training predictive entities to a second training predictive entity of the one or more training predictive entities; generate, for each training predictive entity of the one or more training predictive entities, a randomized prediction by processing the shuffled training data object using the initial prediction model; performing a neutralization of the initial training data object to generate a neutralized training data object, wherein the neutralization of the initial training data object comprises removing each control predictor variable of the one or more control predictor variables for a training predictive entity of the one or more training predictive entities from the initial training data object; and generate the neutralized prediction model based at least in part on the neutralized training data object and each randomized prediction for each training predictive entity of the one or more training predictive entities.

BRIEF DESCRIPTION OF THE DRAWINGS

Figure 1:
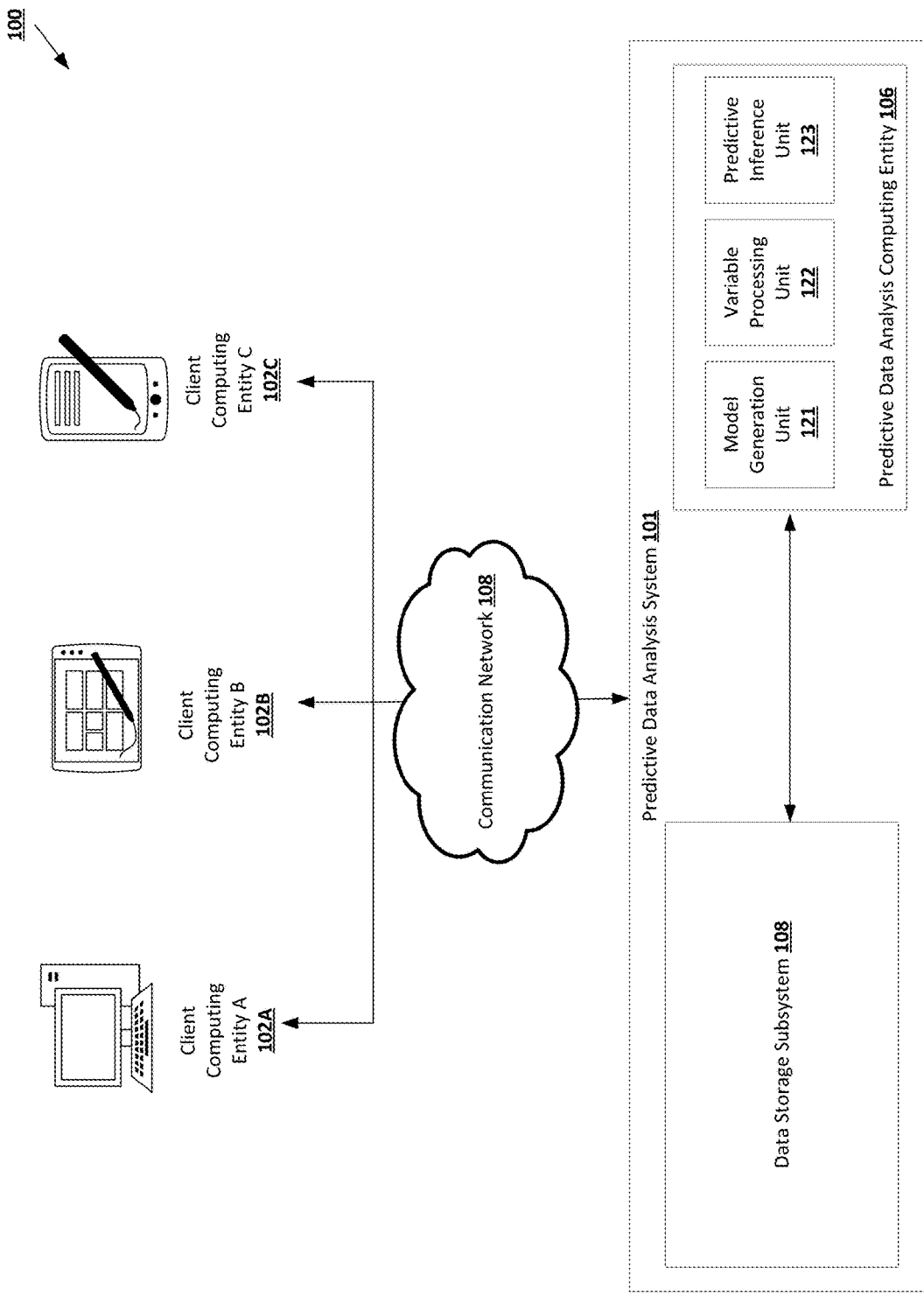

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
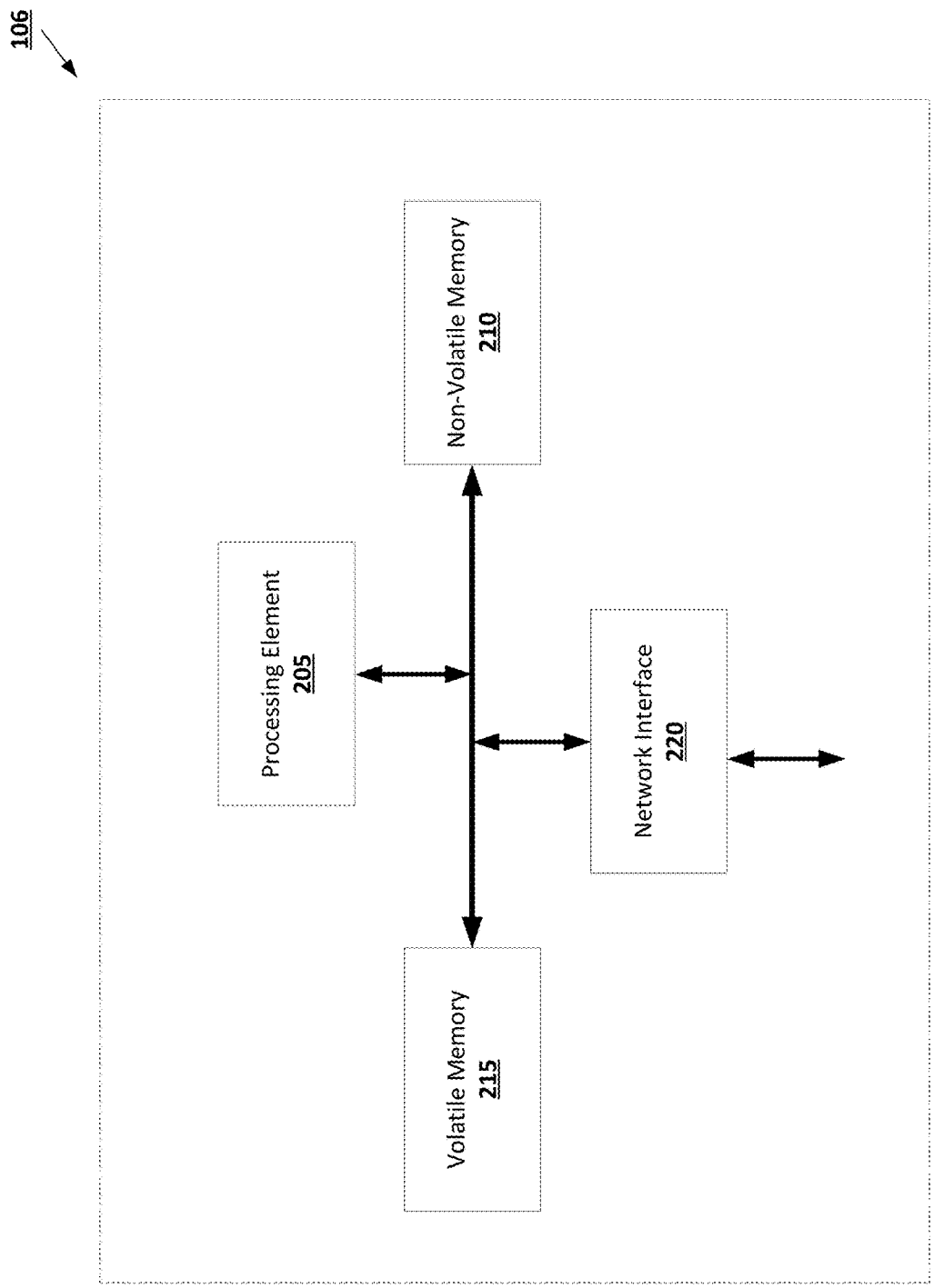

FIG. 2 provides an example predictive data analysis computing entity in accordance with some embodiments discussed herein.

Figure 3:
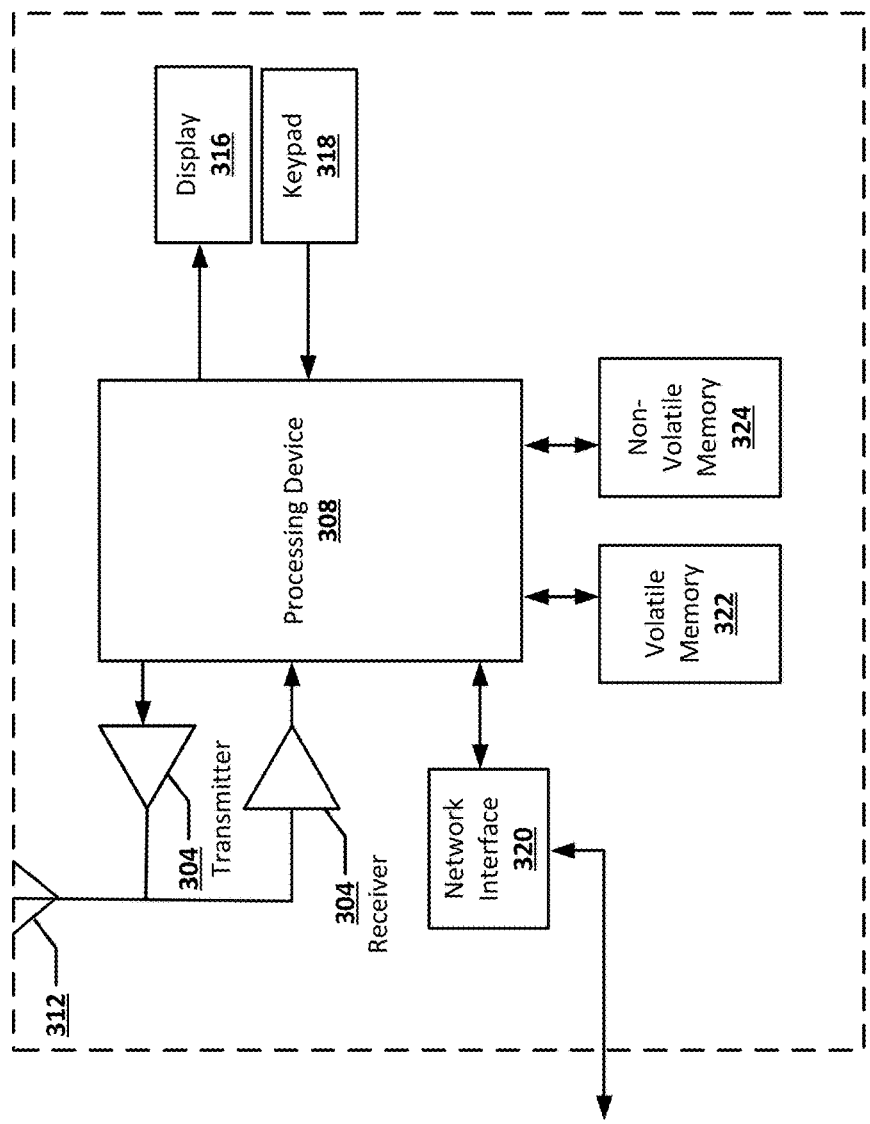

FIG. 3 provides an example client computing entity in accordance with some embodiments discussed herein.

Figure 4:
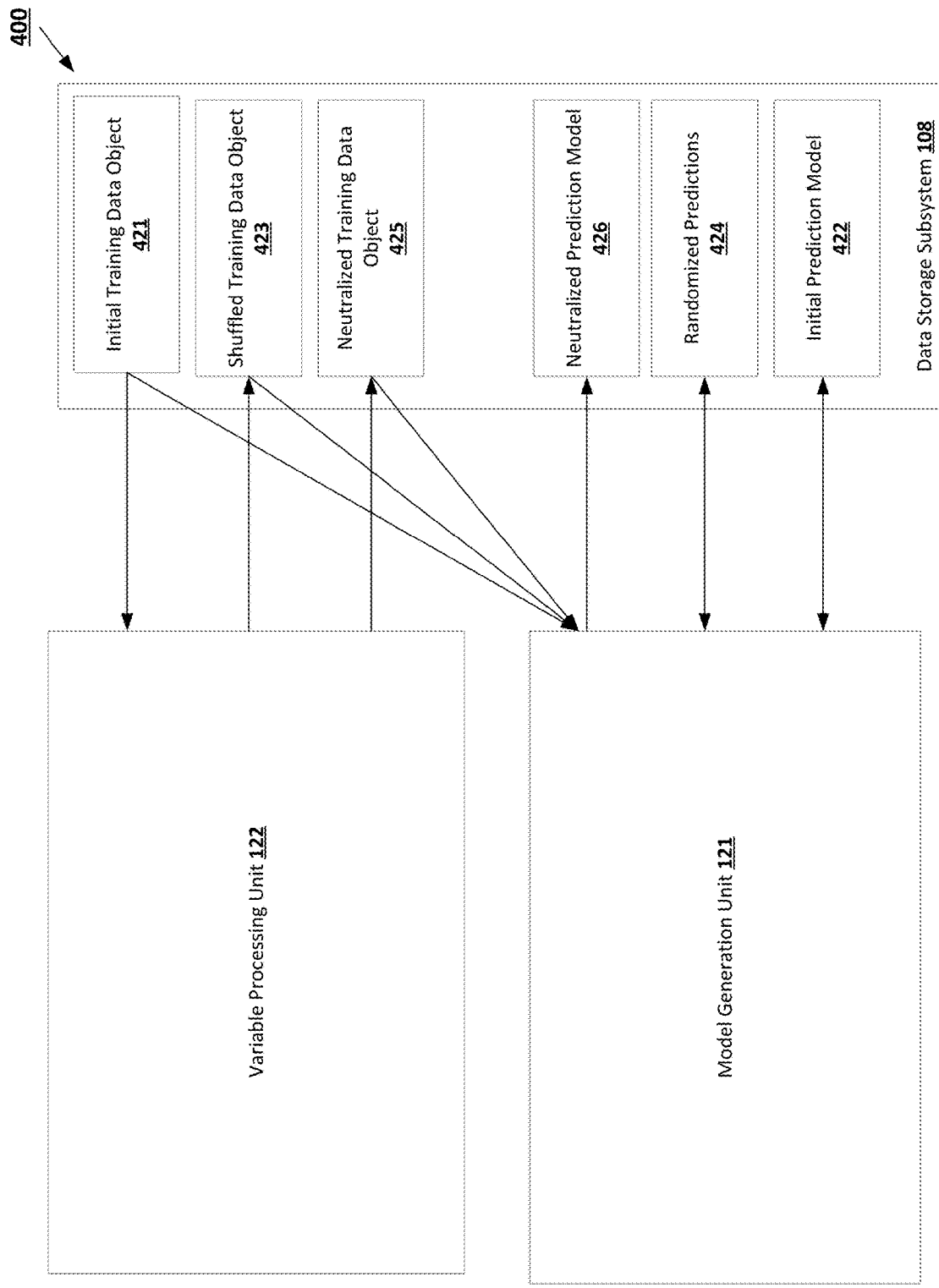

FIG. 4 is a data flow diagram of an example process for generating a neutralized prediction model in accordance with some embodiments discussed herein.

Figure 5:
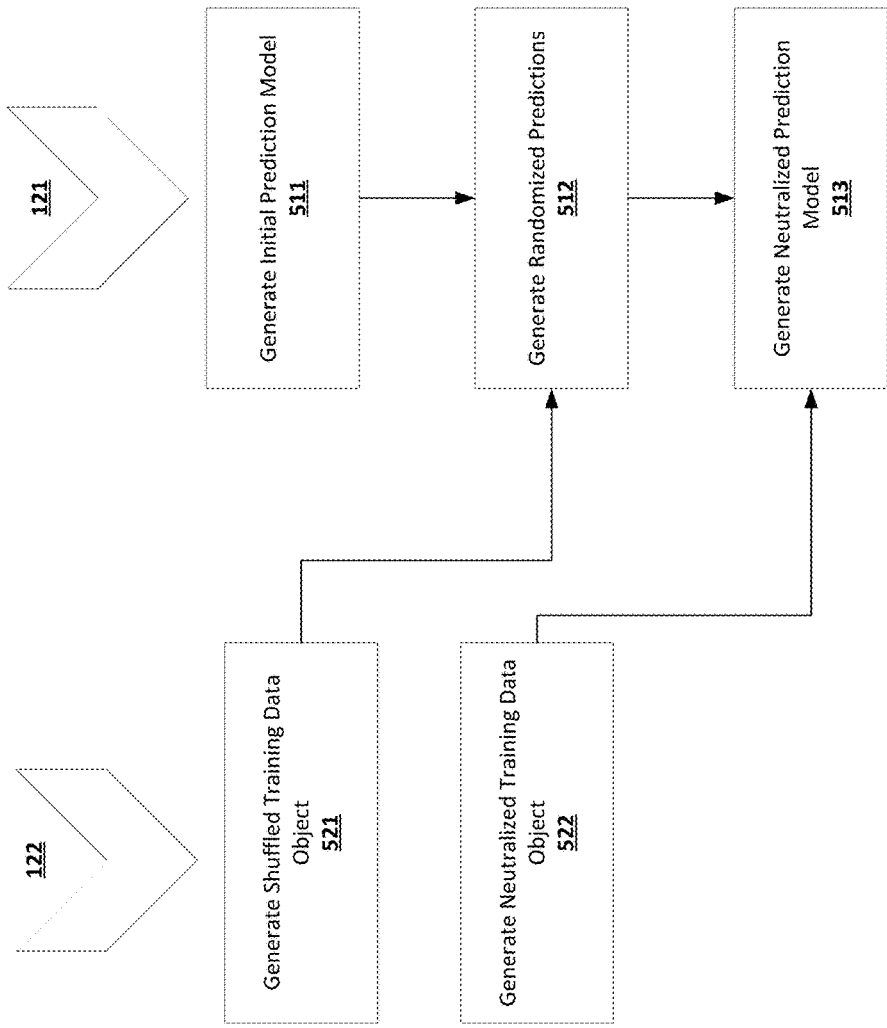

FIG. 5 is a flowchart diagram of an example process for performing variable processing operations and model generation operations configured to generate a neutralized prediction model in accordance with some embodiments discussed herein.

FIG. 6 provides an operational example of an initial training data object in accordance with some embodiments discussed herein.

Figure 7:
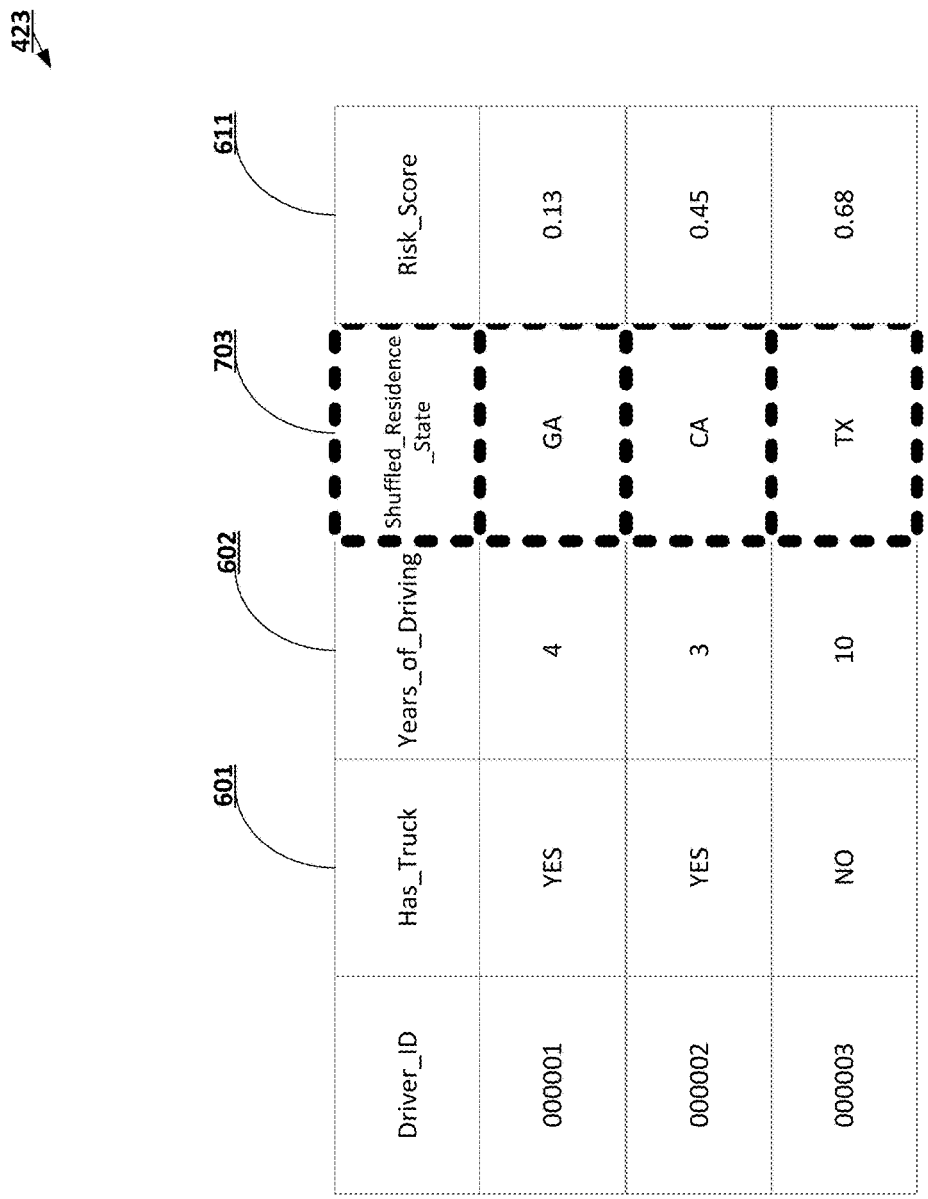

FIG. 7 provides an operational example of a shuffled training data object in accordance with some embodiments discussed herein.

FIG. 8 provides an operational example of a neutralized training data object in accordance with some embodiments discussed herein.

Figure 9A:
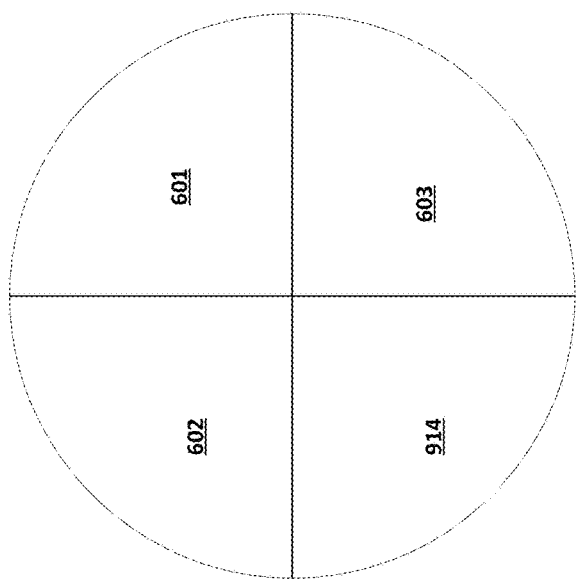
Figure 9B:
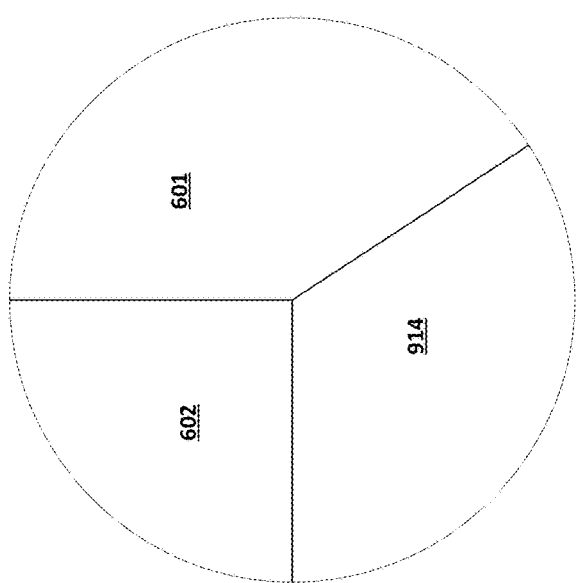
Figure 9C:
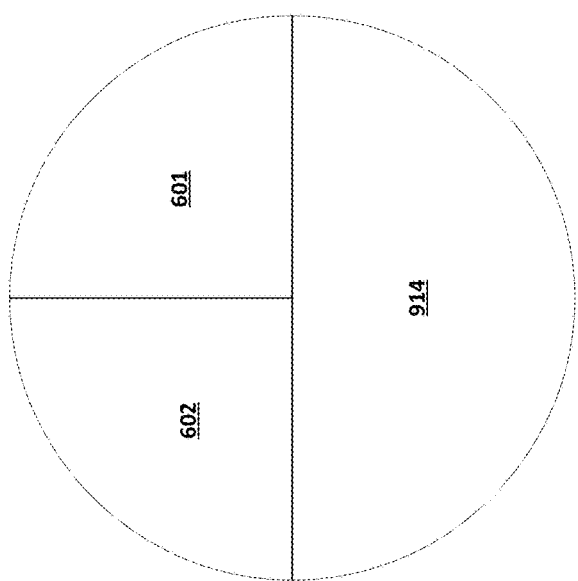

FIGS. 9A-9C provide operational examples of per-predictor prediction influence distribution graphs in accordance with some embodiments discussed herein.

Figure 10:
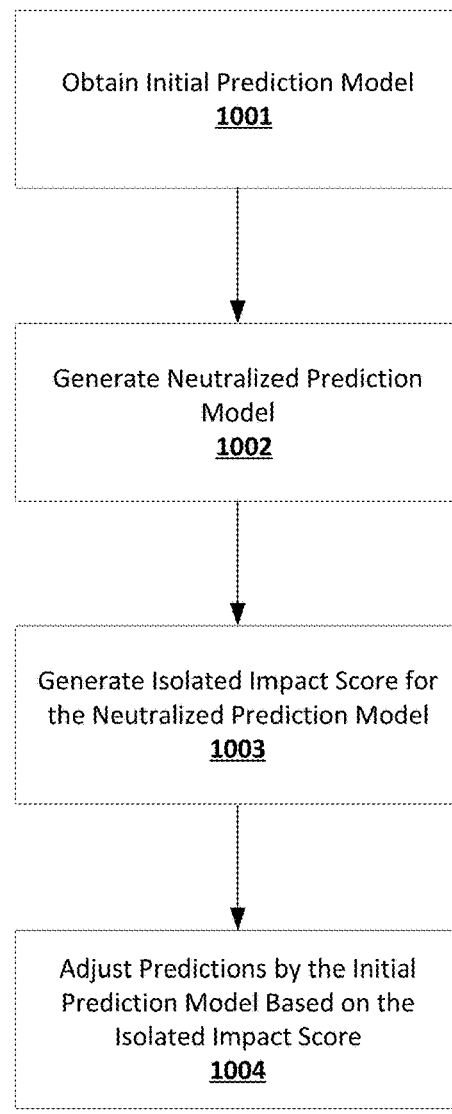

FIG. 10 is a flowchart diagram of an example process for adjusting predictions by a prediction model with an overly expansive input structure using predictor neutralization in accordance with some embodiments discussed herein.

Figure 11:
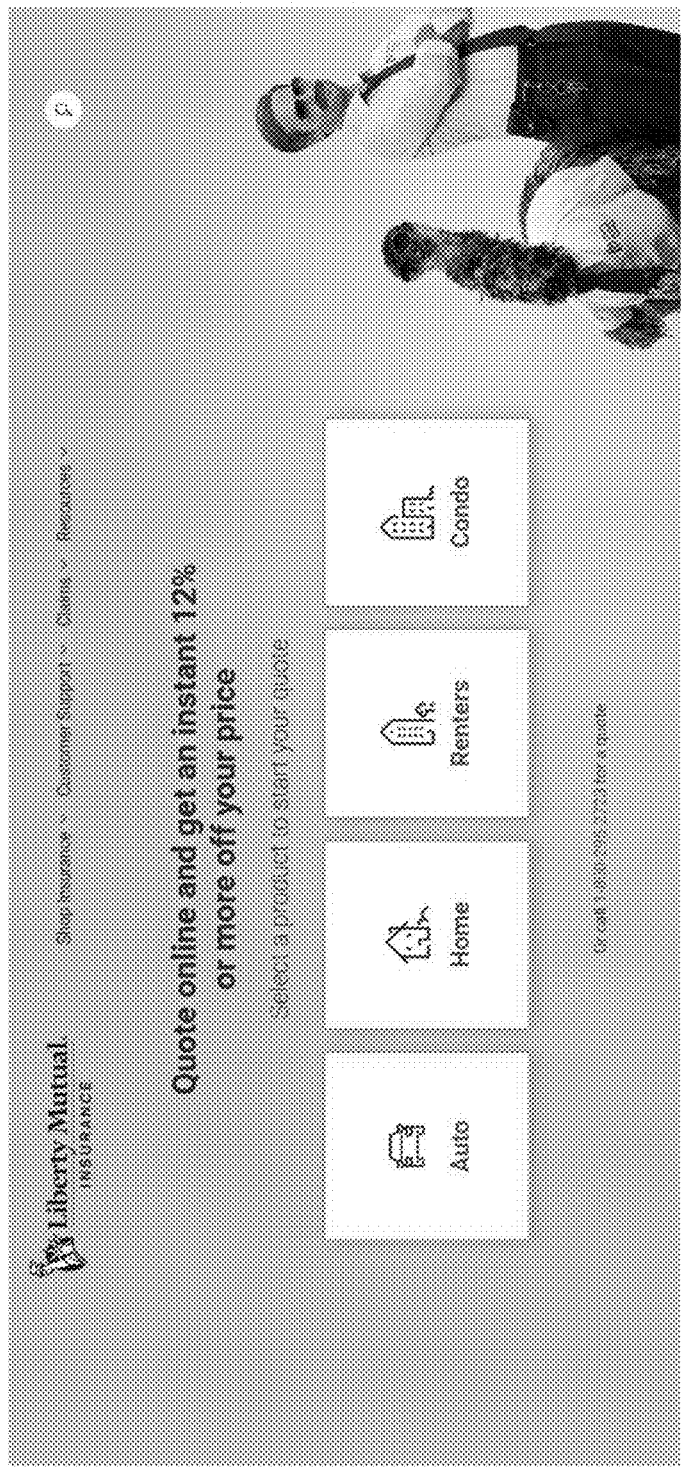

FIG. 11 provides an operational example of a policy type selection interface in accordance with some embodiments discussed herein.

Figure 12:
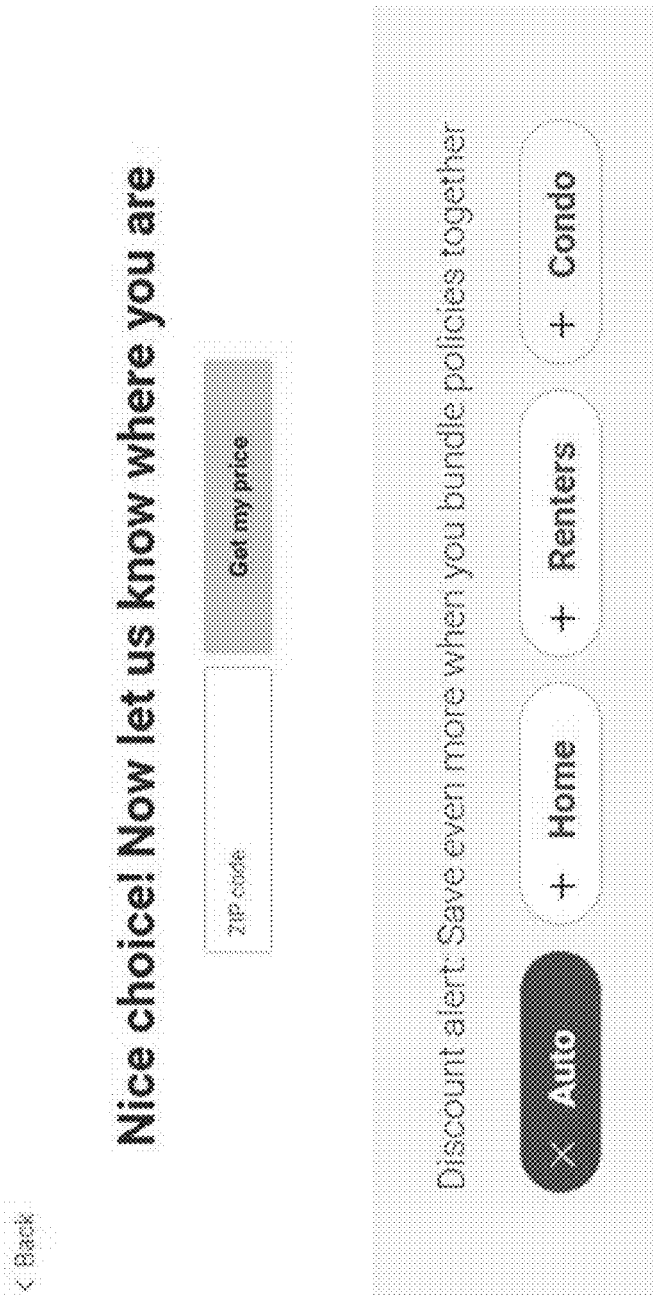

FIG. 12 provides an operational example of a policy type designation and location region designation interface in accordance with some embodiments discussed herein.

Figure 13:
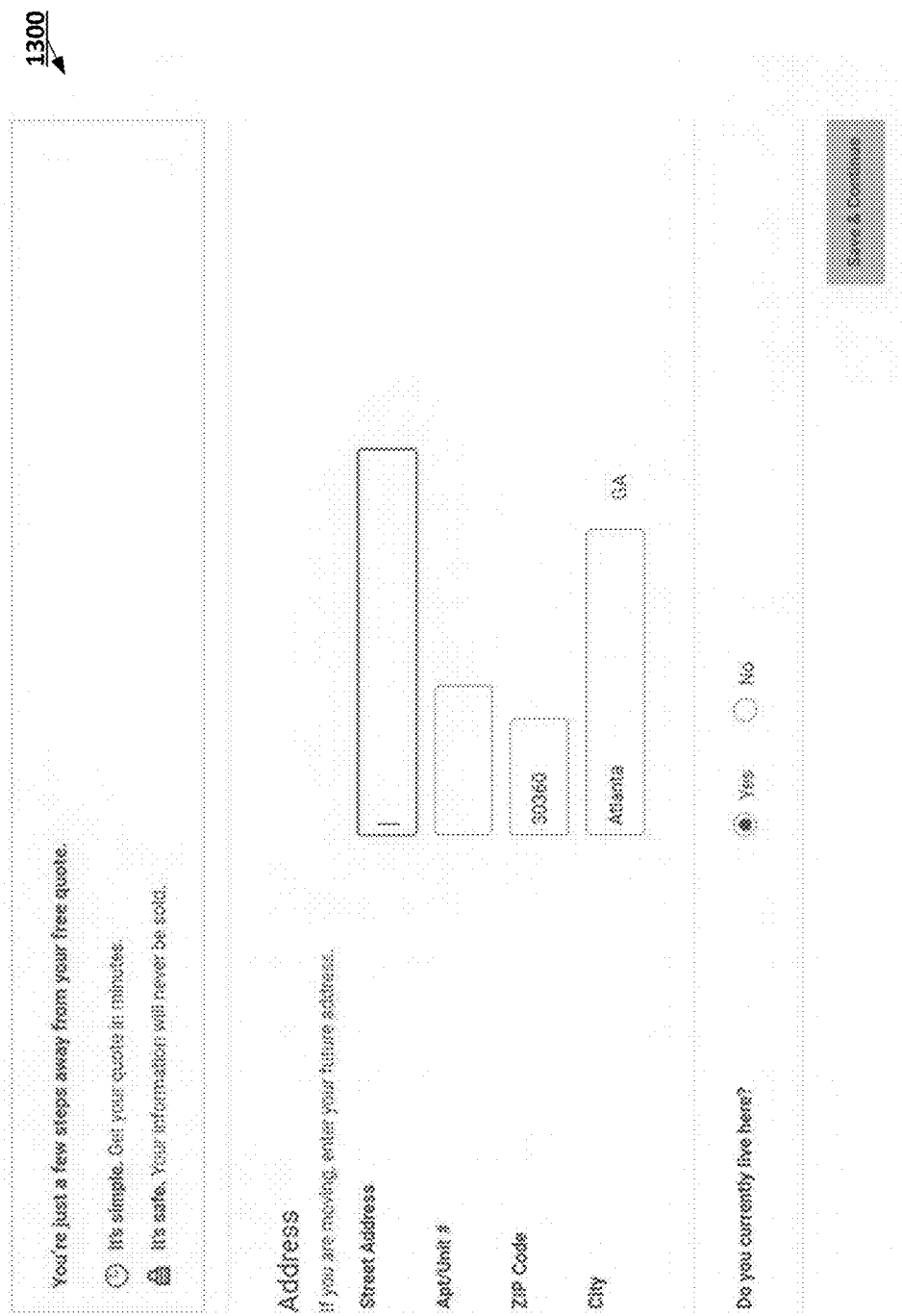

FIG. 13 provides an operational example of an address location designation interface in accordance with some embodiments discussed herein.

Figure 14:
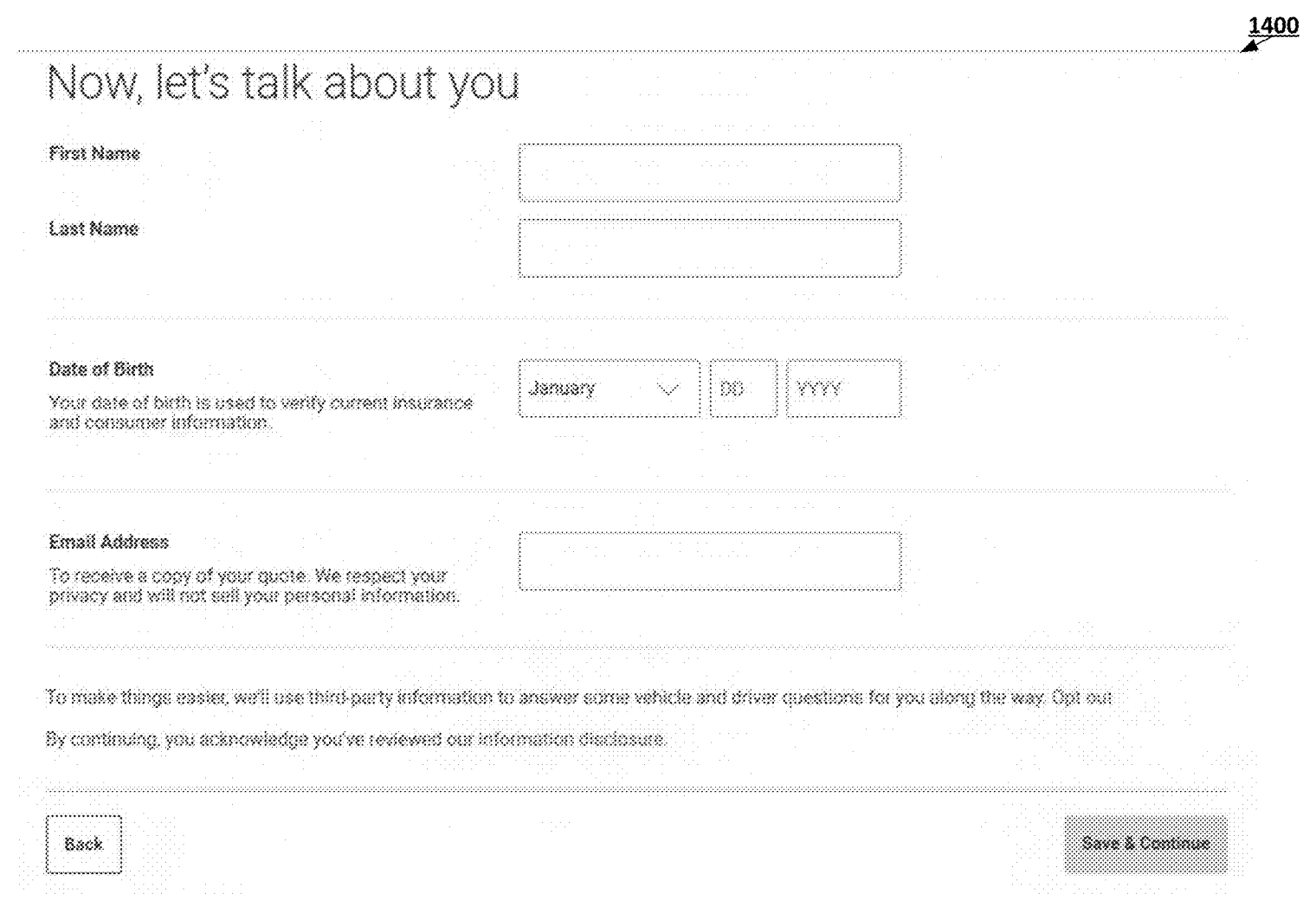

FIG. 14 provides an operational example of a vehicle designation interface in accordance with some embodiments discussed herein.

FIG. 15 provides an operational example of an additional driver designation interface in accordance with some embodiments discussed herein.

Figure 16A:
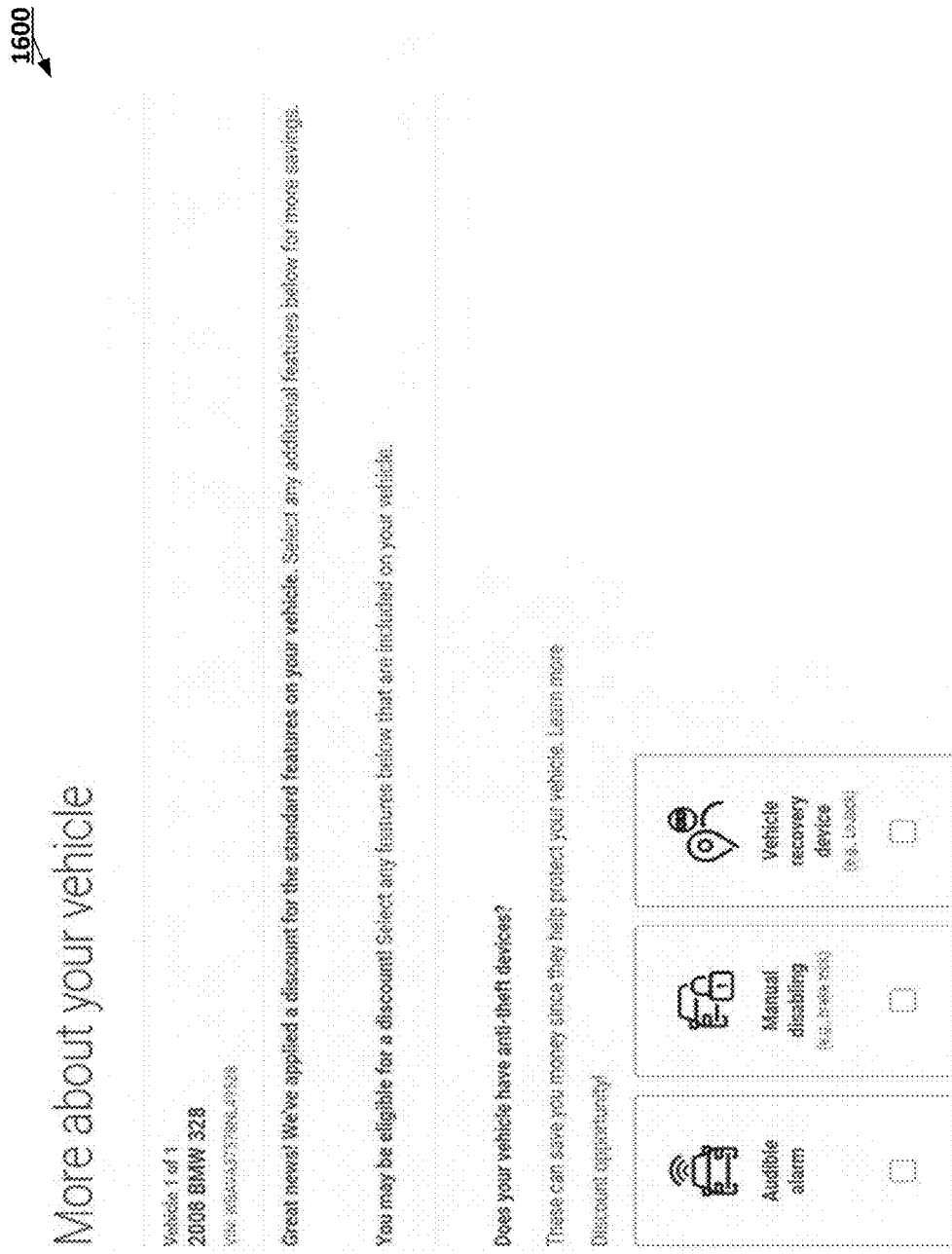
Figure 16B:
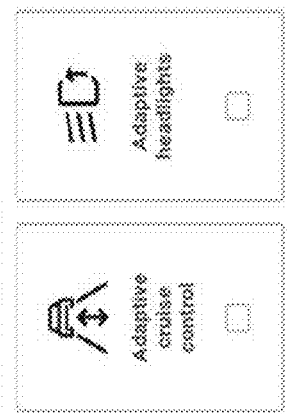

FIG. 16A-16B provide an operational examples of vehicle information entry interfaces in accordance with some embodiments discussed herein.

Figure 17:
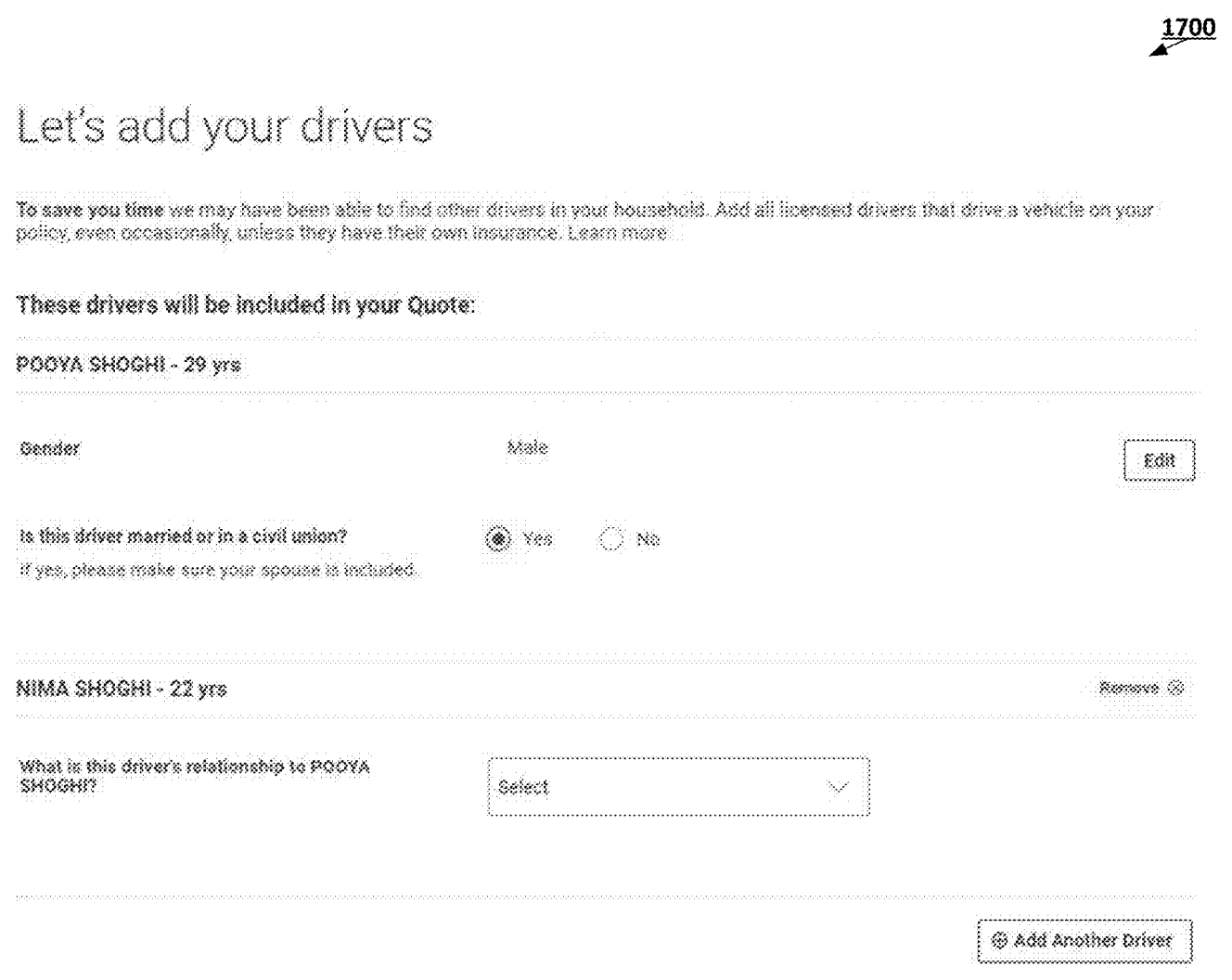

FIG. 17 provides an operational example of a driver information entry interface in accordance with some embodiments discussed herein.

FIG. 18 provides an operational example of discount-related information entry interface in accordance with some embodiments discussed herein.

Figure 19:

FIG. 19 provides an operational example of a current plan information entry interface in accordance with some embodiments discussed herein.

Figure 20:
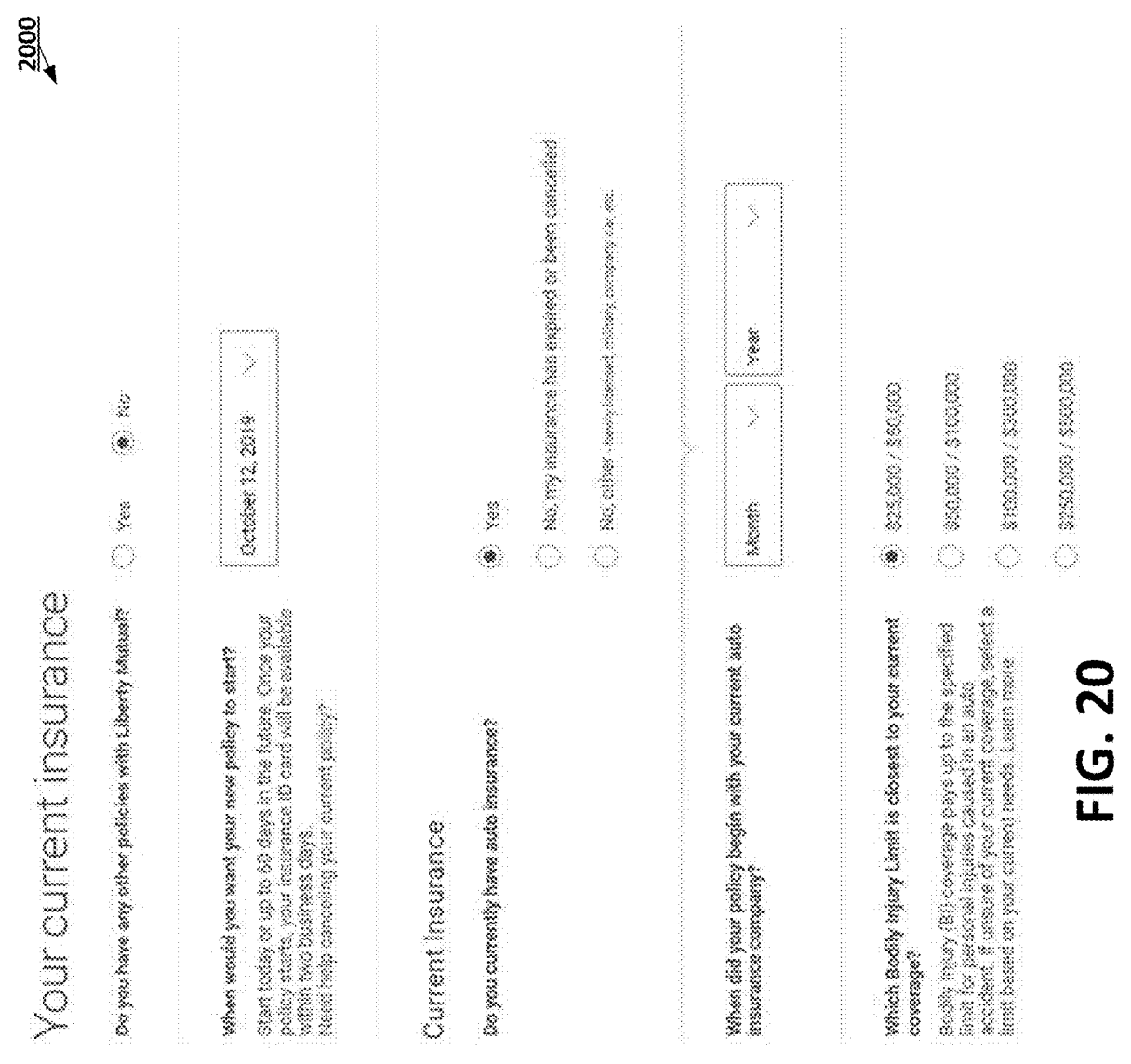

FIG. 20 provides an operational example of a policy type designation and location region designation interface in accordance with some embodiments discussed herein.

Figure 21:
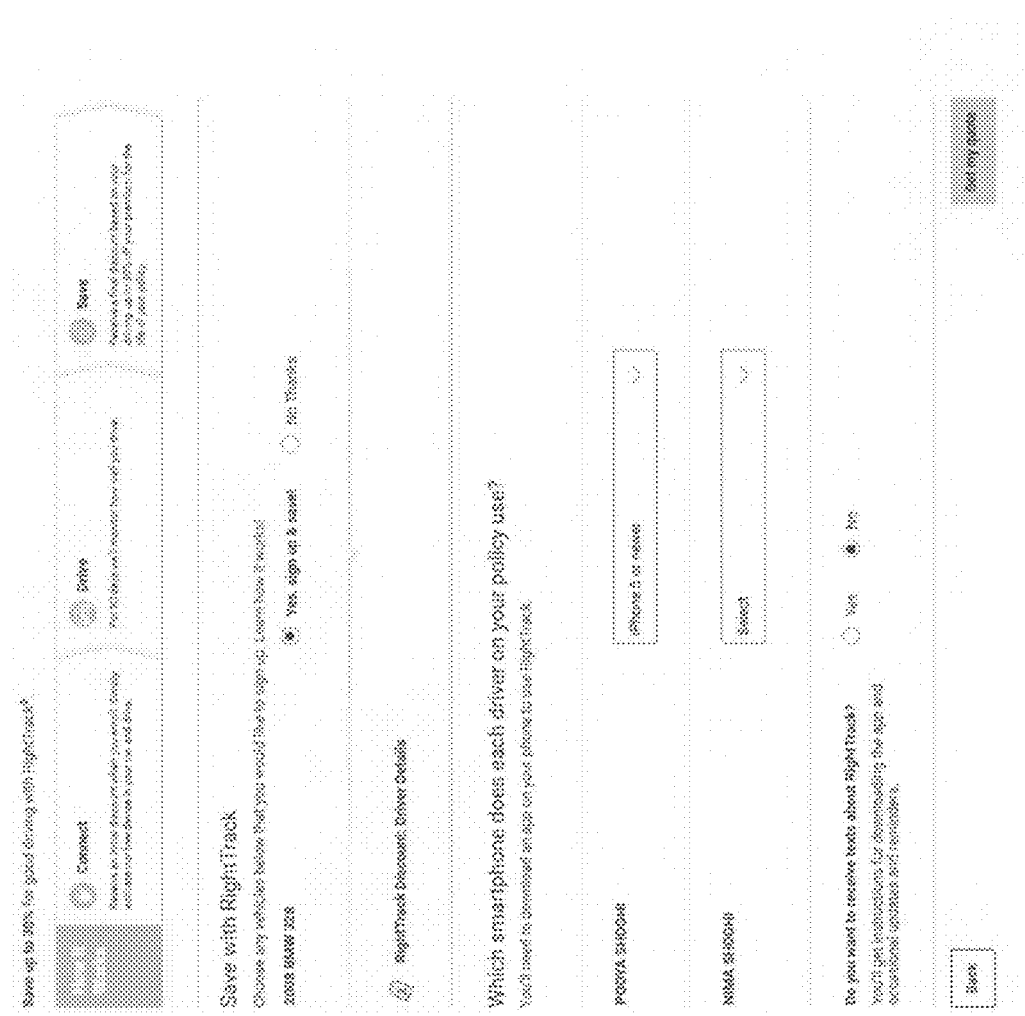

FIG. 21 provides an operational example of a monitoring discount selection interface in accordance with some embodiments discussed herein.

Figure 22:
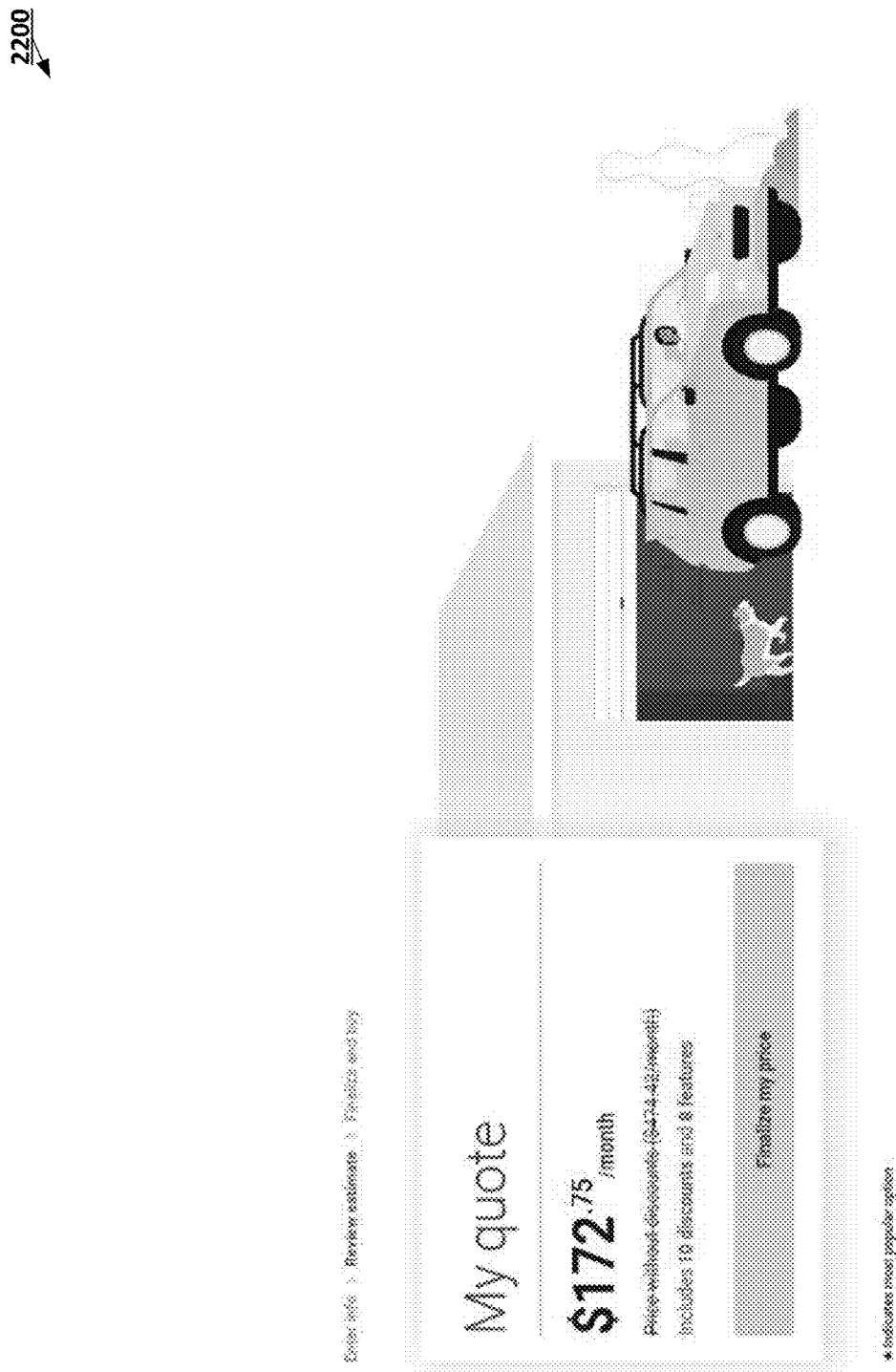

FIG. 22 provides an operational example of a predictive output display interface in accordance with some embodiments discussed herein.

Figure 23:
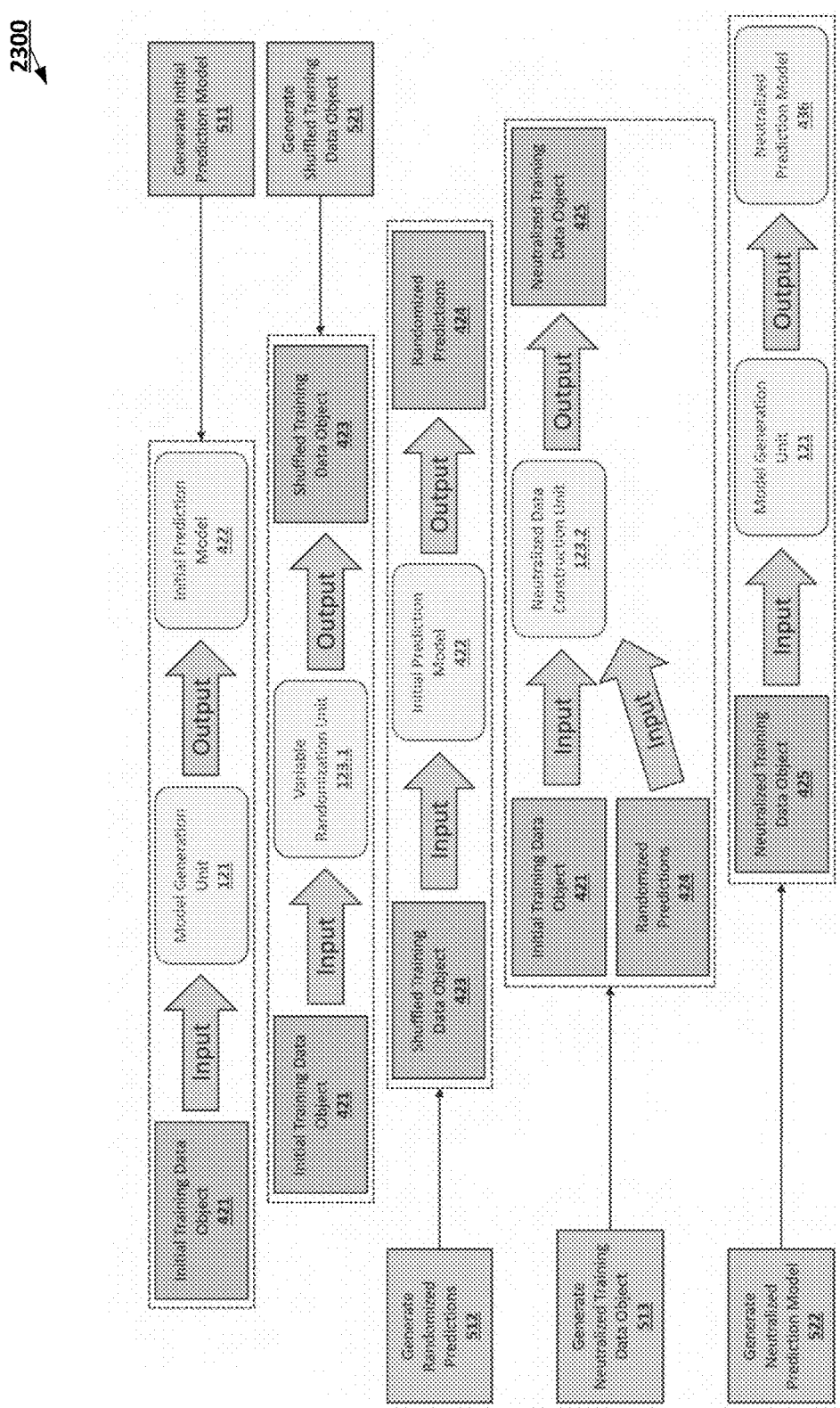

FIG. 23 is a flowchart diagram of an example process for generating a neutralized prediction model in accordance with some embodiments discussed herein.

Figure 24:
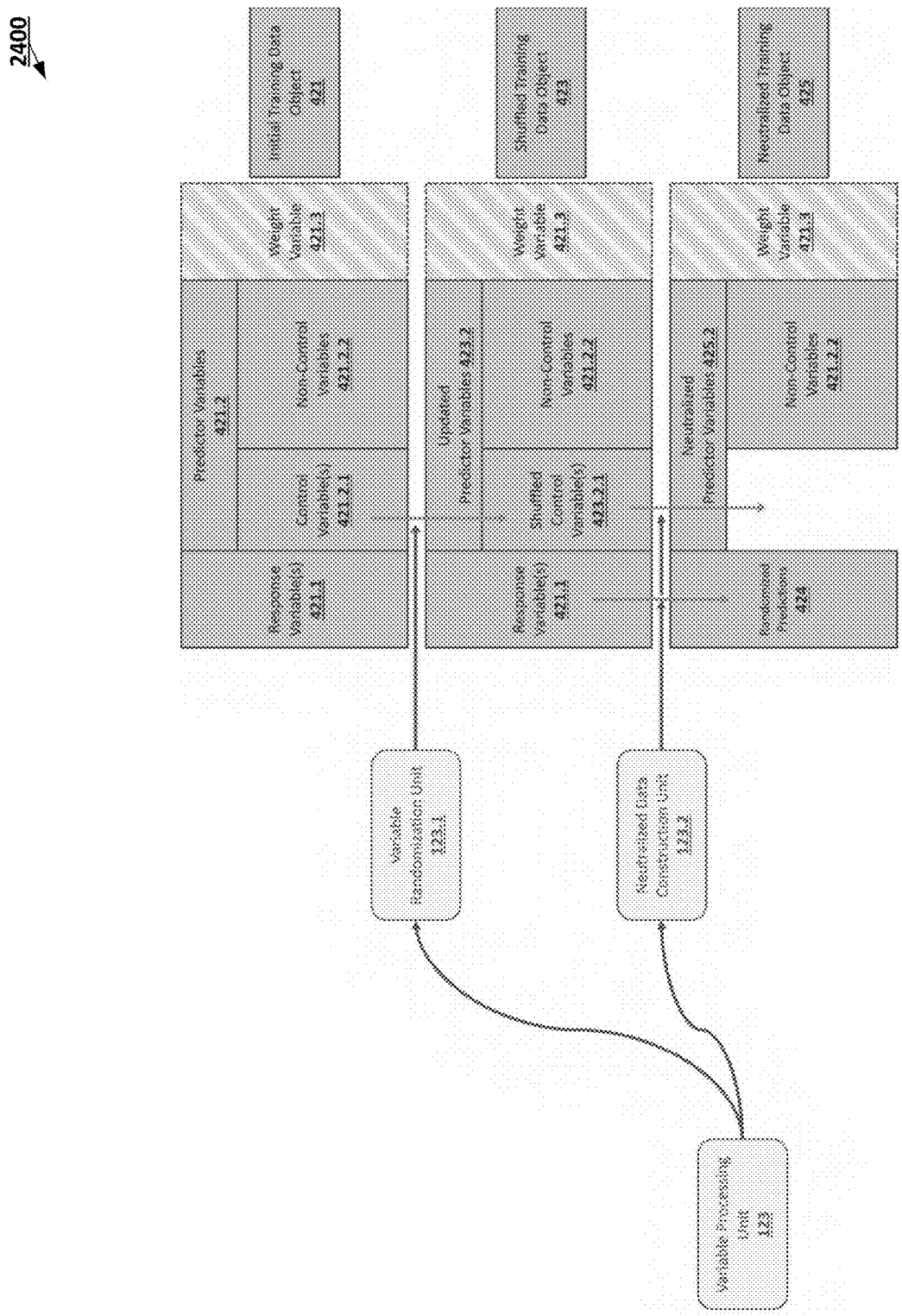

FIG. 24 provides an operational example of a process for generating a neutralized training data object in accordance with some embodiments discussed herein.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. Overview

Various embodiments of the present invention address technical challenges related to increasing efficiency and utility of predictive data analysis system by reducing the need for re-trainings of such prediction models. In recent years, trained prediction models have dominated the advances in machine learning and artificial analysis. Through utilizing available corpuses of training data and effective training algorithms, developers can generate models that, although often time-consuming and costly to train, once trained are relatively efficient and effective. Importantly, training-based machine learning paradigms typically present developers with an asymmetrical cost model, where a greater share resource costs of the model are incurred before end-user interaction with the model. This may be optimal for performing predictive data analysis in domains where the structure of input data is largely static over time. However, changes in the input structure can render trained machine learning models largely inaccurate and necessitate the need for re-training of such models.

Accordingly, there is a continuing technical need for increasing efficiency and utility of predictive data analysis system by reducing the need for re-trainings of such prediction models. Addressing this technical need can enhance the utility of predictive data analysis models in dynamic domains having changing input structure. For example, consider a predictive data analysis model configured to process predictive features F1, F2, and F3 to generate a prediction P1. If post-training understanding of prediction domain renders the predictive feature F3 obsolete or undesirable, the entire model may be jeopardized. This is because the prediction model is configured to incorporate predictive contributions of the predictive feature F3 in generating predictions, but it is no longer desirable to maintain as a predictive feature for the model. In such circumstances, a naïve approach to addressing the described problem will simply remove the predictive feature F3 from the training data.

However, as described below with reference to FIGS. 9A-9C, such a naïve approach fails to effectively eliminate all predictive contributions of the undesirable variable. This is because, while after removal from training data and a re-training the undesirable predictor variable no longer contributes to the prediction, the correlations between the removed predictor variable and non-removed predictor variables prevent all of the removed prediction contributions of the removed predictor variable from being deemed noise. Accordingly, because the correlations between the removed predictor variable and the non-removed predictor variable 601 prevent all of the removed prediction contributions of the control predictor variable from being deemed noise, the control predictor variable cannot be deemed to have completely and "cleanly" removed from the trained prediction model. This in turn leads to ineffective models that would need to be trained with more training data in order to achieve optimal predictive accuracies.

Various embodiments of the present invention provide predictor neutralization techniques that enable a "clean" removal of undesirable predictor variables from the prediction model. For example, in some embodiments, to perform predictor neutralization of an initial training model, a predictive data analysis system first accesses (e.g., generate and/or provides input to) the initial prediction model, wherein the initial prediction model is trained using an initial training data object, and the initial training data object comprises, for each training predictive entity of one or more training predictive entities, one or more desirable predictor variables, one or more undesirable variables, and one or more response variables. Subsequently, the predictive data analysis system performs a randomized shuffling of the initial training data object to generate a shuffled training data object, where the randomized shuffling of the initial training data object comprises assigning each control predictor variable of the one or more control predictor variables for a first training predictive entity of the one or more training predictive entities to a second training predictive entity of the one or more training predictive entities. Afterward, the predictive data analysis system generates, for each training predictive entity of the one or more training predictive entities, a randomized prediction by processing the shuffled training data object using the initial prediction model and performs a neutralization of the initial training data object to generate a neutralized training data object, where the neutralization of the initial training data object comprises removing each control predictor variable of the one or more control predictor variables for a training predictive entity of the one or more training predictive entities from the initial training data object. Finally, the predictive data analysis system generates the neutralized prediction model based at least in part on the neutralized training data object and each randomized prediction for each training predictive entity of the one or more training predictive entities.

By utilizing the exemplary predictor neutralization technique described above and the related techniques described herein, various embodiments of the present invention provide predictor neutralization techniques enable post-training adjustments of prediction models as well as post-training model refinements of prediction models. In doing so, various embodiments of the present invention reduce the need for re-trainings of such prediction models and increase efficiency of re-trainings of trained prediction models. Accordingly, various embodiments of the present invention address technical challenges related to increasing efficiency and utility of predictive data analysis system by reducing the need for re-trainings of such prediction models and make important technical contributions to improving training efficiency of predictive data analysis models deployed in dynamic predictive domains with changing input structures.

II. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations. Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. Exemplary System Architecture

FIG. 1 provides an exemplary overview of an architecture 100 that can be used to practice embodiments of the present invention. The architecture 100 includes a predictive data analysis system 101 and one or more client computing entities 102A-C that communicate over one or more communication networks, such as the communication network 108. The communication network 108 may include any wired or wireless communication network including, for example, a wired or wireless local area network (LAN), personal area network (PAN), metropolitan area network (MAN), wide area network (WAN), or the like, as well as any hardware, software and/

In some embodiments, the predictive data analysis system 101 provides one or more insurance-related services to the client computing entities 102A-C. For example, at least some of the one or more client computing entities 102A-C may provide prediction inputs to the predictive data analysis system 101 and receive predictive outputs from the predictive data analysis system 101 in response to providing the prediction inputs. As another example, at least some of the client computing entities 102A-C may provide prediction inputs to the predictive data analysis system 101 and request performance of particular prediction-based actions in accordance with the provided predictions. As a further example, at least some of the client computing entities 102A-C may provide training data objects to the predictive data analysis system 101 and request the training of a prediction model in accordance with the provided training data objects. In some of the noted embodiments, the predictive data analysis system 101 may be configured to transmit parameters and/or hyper-parameters of a trained machine learning model to the client computing entities 102.

In some embodiments, at least some of the client computing entities 102A-C may provide driver data to the predictive data analysis system 101 and obtain/receive at least one of insurance risk scores, insurance quotes, insurance promotions, insurance-related actions, etc. from the predictive data analysis system 101. For example, a client computing entity 102A-C may be a consumer computing entity seeking to obtain/receive an insurance quote from the predictive data analysis system 101. As another example, a client computing entity 102A-C may be an insurance company employee computing entity seeking to obtain/receive driver risk scores from the predictive data analysis system. As yet another example, a client computing entity 102A-C may be an insurance company employee computing entity seeking to automatically generate insurance promotions based on a corpus of driver data for multiple driver profiles (e.g., for driver profiles whose driver risk scores is below a risk score threshold). As a further example, a client computing entity 102A-C may be an insurance company employee computing entity seeking to automatically schedule defensive driving course appointments for driver profiles whose driver risk scores exceeds a risk threshold. In the latter two examples, the risk thresholds may be generated by the predictive data analysis system 101 using a process that at least in part utilizes the predictor variable neutralizations described herein.

The predictive data analysis computing entity 106 may include a predictive data analysis computing entity 106 and a storage subsystem 108. The predictive data analysis computing entity 106 may be configured to train prediction models based at least in part on the training data stored in the storage subsystem 108, utilize the trained models to generate predictions based at least in part on prediction inputs provided by a client computing entity 102, and perform prediction-based actions based at least in part on the generated predictions. The predictive data analysis computing entity 106 may include a model generation unit 121 configured to generate prediction models (e.g., using the predictor neutralization techniques described herein), a variable processing unit 122 configured to generate appropriate training data to the model generation unit 121 to facilitate model generate, and a predictive inference unit 123 configured to utilize the models generated by the model generation unit 121 to generate predictions and/or perform prediction-based actions.

The storage subsystem may be configured to store the model definition data for one or more predictive analysis models and the training data uses to train one or more predictive analysis models. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

A. Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include or be in communication with one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive data analysis computing entity 106 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include or be in communication with one or more input elements, such as a keyboard input, a mouse input, a touch screen/display input, motion input, movement input, audio input, pointing device input, joystick input, keypad input, and/or the like. The predictive data analysis computing entity 106 may also include or be in communication with one or more output elements (not shown), such as audio output, video output, screen/display output, motion output, movement output, and/or the like.

B. Exemplary Client Computing Entity

FIG. 3 provides an illustrative schematic representative of a client computing entity 102A-C that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102A-C can be operated by various parties. As shown in FIG. 3, the client computing entity 102A-C can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102A-C may be capable of operating with one or more air interface standards, communication protocols, modulation types, and access types. More particularly, the client computing entity 102A-C may operate in accordance with any of a number of wireless communication standards and protocols, such as those described above with regard to the predictive data analysis computing entity 106. In a particular embodiment, the client computing entity 102A-C may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102A-C may operate in accordance with multiple wired communication standards and protocols, such as those described above with regard to the predictive data analysis computing entity 106 via a network interface 320.

Via these communication standards and protocols, the client computing entity 102A-C can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102A-C can also download changes, add-ons, and updates, for instance, to its firmware, software (e.g., including executable instructions, applications, program modules), and operating system.

According to one embodiment, the client computing entity 102A-C may include location determining aspects, devices, modules, functionalities, and/or similar words used herein interchangeably. For example, the client computing entity 102A-C may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102A-C position in connection with a variety of other systems, including cellular towers, Wi-Fi access points, and/or the like. Similarly, the client computing entity 102A-C may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102A-C may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102A-C to interact with and/or cause display of information/data from the predictive data analysis computing entity 106, as described herein. The user input interface can comprise any of a number of devices or interfaces allowing the client computing entity 102A-C to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102A-C and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102A-C can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the predictive data analysis computing entity 106 and/or various other computing entities.

In another embodiment, the client computing entity 102A-C may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the client computing entity 102A-C may be embodied as an artificial intelligence (AI) computing entity, such as an Amazon Echo, Amazon Echo Dot, Amazon Show, Google Home, and/or the like. Accordingly, the client computing entity 102A-C may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

IV. Exemplary System Operations

Various embodiments of the present invention address technical challenges related to increasing efficiency and utility of predictive data analysis system by reducing the need for re-trainings of such prediction models. In recent years, trained prediction models have dominated the advances in machine learning and artificial analysis. Through utilizing available corpuses of training data and effective training algorithms, developers can generate models that, although often time-consuming and costly to train, once trained are relatively efficient and effective. Importantly, training-based machine learning paradigms typically present developers with an asymmetrical cost model, where a greater share resource costs of the model are incurred before end-user interaction with the model. This may be optimal for performing predictive data analysis in domains where the structure of input data is largely static over time. However, changes in the input structure can render trained machine learning models largely inaccurate and necessitate the need for re-training of such models.

By utilizing the exemplary predictor neutralization technique described above and the related techniques described herein, Various embodiments of the present invention provide predictor neutralization techniques enable post-training adjustments of prediction models as well as post-training model refinements of prediction models. In doing so, various embodiments of the present invention reduce the need for re-trainings of such prediction models and increase efficiency of re-trainings of trained prediction models. Accordingly, various embodiments of the present invention address technical challenges related to increasing efficiency and utility of predictive data analysis system by reducing the need for re-trainings of such prediction models and make important technical contributions to improving training efficiency of predictive data analysis models deployed in dynamic predictive domains with changing input structures.

FIG. 4 is a data flow diagram of an example process 400 for generating a neutralized prediction model 426. Via the various steps/operations depicted in FIG. 4, the predictive data analysis computing entity 106 can generate a neutralized prediction model 426, where the neutralized prediction model 426 is generated by using one or more randomized predictions 424 which are in turn generated based on a shuffled training data object 423.

As depicted in FIG. 4, the process 400 includes two sets of steps/operations: steps/operations performed by the variable processing unit 122 of the predictive data analysis computing entity 106 and steps/operations performed by the model generation unit 121 of the predictive data analysis computing entity 106. The steps/operations performed by the variable processing unit 122 include generating the shuffled training data object 423 based on an initial training data object 421 and generating a neutralized training data object 425 based on the initial training data object 421. The steps/operations performed by the model generation unit 121 include generating an initial prediction model 422, generating the randomized predictions 424 by processing the shuffled training data object 423 using the initial prediction model 422, and generating the neutralized prediction model 426 based on the randomized predictions 424 and the neutralized training data object 425.

In some embodiments, the model generation unit 121 retrieves (e.g., from the storage subsystem 108) a stored version of the initial prediction model 422. In some embodiments, the model generation unit 121 generates the initial prediction model based at least in part on the initial training data object 421. In some embodiments, accessing (e.g., generating and/or providing input to) the initial prediction model 422 includes generating the initial prediction model.

In some embodiments, the steps/operations of the process 400 performed by the variable processing unit 122 and the steps/operations performed by the model generation unit 121 are performed as depicted in FIG. 5, which is a flowchart diagram of an example process for performing variable processing operations and model generation operations configured to generate the neutralized prediction model 426. The process 400 begins at step/operation 511 when the model generation unit 121 generates the initial prediction model 422. In some embodiments, the initial prediction model 422 is a generalized linear model. In some embodiments, the initial prediction model 422 is a non-linear prediction model, e.g., a prediction model that includes one or more non-linear operations (e.g., a neural-network-based prediction model).

In some embodiments, the initial prediction model 422 is trained using an initial training data object 421. In some embodiments, the initial training data object 421 includes, for each training predictive entity of one or more training predictive entities, one or more control predictor variables, one or more predictor variables, and one or more response variables. In some embodiments, the initial prediction model 422 is configured to perform predictive data analysis in accordance with an initial model input structure characterized by a plurality of predictor variable types, where the plurality of predictor variable types includes one or more control predictor variable types and one or more non-control predictor variable types. In some embodiments, each control predictor variable for a training predictive entity is associated with a control predictor variable type and each non-control predictor variable of the one or more control predictor variables for a training predictive entity of the one or more training predictive entities is associated with a non-control predictor variable type.

An operational example of an initial training data object 421 is depicted in FIG. 6. The example initial training data object 421 depicted in FIG. 6 includes, for each training predictive entity of three training predictive entities each associated with a driver identifier of three driver identifiers, three predictor variables 601-603 and a response variable 611. The three predictor variables 601-603 include predictor variable 601 describing whether a driver profile has truck (i.e., the Has Truck predictor variable), predictor variable 602 describing years of driving experience of a driver profile (i.e., the Years of Driving predictor variable), and predictor variable 603 describing a residence state of a driver profile (i.e., the Residence State predictor variable). The response variable 611 included in the example initial training data object 421 of FIG. 6 describe a risk score of a driver (i.e., the Risk Score response variable). Among the predictor variables 601-603 included in the example initial training data object 421 of FIG. 6, the predictor variables 601-602 are non-control predictor variables, while the predictor variable 603 is a control predictor variable. While the exemplary training data object depicted in FIG. 6 includes three data variables for three predictive entities including two non-control predictor variables and one control predictor variable, a person of ordinary skill in the relevant technology will recognize that a training data object may include any number of predictor variables, control predictor variables, non-control predictor variables, and associated predictive entities.

The predictor values included among the training data may include predictor values determined using one or more predictor input interfaces. Examples of predictor input interfaces are depicted in FIGS. 11-22. Each of the depicted predictor input interfaces gathers predictor information about one or more types of predictor information. As depicted in the vehicle designation interface 1500 of FIG. 15, the variable processing unit 122 may generate default values and/or recommended values for at least some of the inputted predictor values. The predictor input interfaces depicted in FIGS. 11-22 include the policy type designation interface 1100 of FIG. 11, the policy type and location region designation interface 1200 of FIG. 12, the address location designation interface 1300 of FIG. 13, the vehicle designation interface 1400 of FIG. 14, the additional driver designation interface 1500 of FIG. 15, the vehicle information entry interfaces 1600, 1650 of FIGS. 16A-16B, the driver information entry interface 1700 of FIG. 17, the discount-related information entry interface 1800 of FIG. 18, the current plan information entry interface 1900 of FIG. 19, the policy type designation and location region designation interface 2000 of FIG. 20, and the monitoring discount selection interface 2100 of FIG. 21.

Returning to FIG. 5, at step/operation 521, the variable processing unit 122 generates the shuffled training data object 423 based on the initial training data object 421. In some embodiments, to generate the shuffled training data object 423 based on the initial training data object 421, the variable processing unit 122 performs a randomized shuffling of the initial training data object 421. In some embodiments, performing the randomized shuffling of the initial training data object 421 includes randomly assigning each control predictor variable for a particular training predictive entity as the corresponding control predictor variable for another training predictive entity, where the noted random re-assignment (i.e., re-ordering) of the control predictor variable values across training predictive entities can be performed using one or more random assignment routines, such as one or more random assignment algorithms that operate based on one or more random probability distributions for the one or more control predictor variables.

An operational example of a shuffled training data object 423 is depicted in FIG. 7. The exemplary shuffled training data object 423 of FIG. 7 includes non-control predictor variables 601-602 for the three training predictive entities associated with the initial training data object 421 of FIG. 6 in the same order as the order of the values of each of non-control predictor variables 601-602 in the initial training data object 421. However, with respect to the control predictor variable 603 in the initial training data object 421, the values corresponding to the noted control predictor variable 603 have been randomly shuffled to generate the values for the randomly-shuffled control predictor variable 703 in the shuffled training data object 423. For example, to generate the values for the randomly-shuffled control predictor variable 703 in the shuffled training data object 423, the variable processing unit 122 has assigned the value of TX, which was assigned to the first training predictive entity in the initial training data object 421, to the third training predictive entity in the randomly-shuffled control predictor variable 703. Furthermore, the variable processing unit 122 has assigned the value of GA, which was assigned to the second training predictive entity in the initial training data object 421, to the first training predictive entity in the randomly-shuffled control predictor variable 703. Moreover, the variable processing unit 122 has assigned the value of CA, which was assigned to the third training predictive entity in the initial training data object 421, to the second training predictive entity in the randomly-shuffled control predictor variable 703.

Returning to FIG. 5, at step/operation 512, the model generation unit 121 generates the randomized predictions 424. In some embodiments, the model generation unit 121 generates, for each training predictive entity of the one or more training predictive entities, a randomized prediction 424 by processing the shuffled training data object 423 using the initial prediction model 422. In some embodiments, to generate the randomized prediction 424 for a particular training predictive entity of the one or more training predictive entities, the model generation unit 121 processes the predictor variable values associated with the particular training predictive entity in the shuffled training data object 423 (including the non-shuffled non-control predictor variable values and the shuffled control predictor variable values) using the initial prediction model 422. In some embodiments, processing the shuffled training data object 423 using the initial prediction model 422 includes performing an inference using the initial prediction model 422 based on input values extracted from the shuffled training data object 423. In some embodiments, performing an inference using the initial prediction model 422 includes performing a forward propagation using one or more parameters and/or one or more hyper-parameters of the initial prediction model 422, where the forward propagation is performed based on input values extracted from the shuffled training data object 423.

At step/operation 522, the variable processing unit 122 generates the neutralized training data object 425 based on the initial training data object 421. In some embodiments, to generate the neutralized training data object 425 based on the initial training data object 421, the variable processing unit 122 performs a neutralization of the initial training data object 421 to generate a neutralized training data object, where the neutralization of the initial training data object 421 may include removing each control predictor variable of the one or more control predictor variables for a training predictive entity of the one or more training predictive entities from the initial training data object 421. In some embodiments, to generate the neutralized training data object 425 based on the initial training data object 421, the variable processing unit 122 removes the control predictor variable values from the initial training data object 421. An operational example of a neutralized training data object 425 is depicted in FIG. 8. As depicted in the exemplary neutralized training data object 425 of FIG. 8, the variable processing unit 122 has removed the values associated with the control predictor variable 603 from the initial training data object 421 to generate the neutralized training data object 425 of FIG. 8.

At operation 513, the model generation unit 121 generates the neutralized prediction model 426 based on the neutralized training data object 425 and the randomized predictions 424. In some embodiments, to generate the neutralized prediction model 426 based on the neutralized training data object 425 and the randomized predictions 424, the model generation unit 121 utilizes a training algorithm to train a prediction model. In some of those embodiments, to train the neutralized prediction model 426, the training algorithm utilized by the model generation unit 121 uses the predictor variable values in the neutralized training data object 425 as the predictor inputs and the randomized predictions 424 as the response variables. In some embodiments, to train the neutralized prediction model 426, the model generation unit 121 generates an inferred prediction for each training predictive entity based on the predictor variable values for the training predictive entity in the neutralized training data object 425, generates a measure of error between the inferred prediction for each training predictive entity and the randomized prediction 424 for the corresponding training predictive entity, and modifies one or more parameters and/or hyper-parameters of the neutralized prediction model 426 in order to optimize (e.g., minimize and/or maximize) the generated measure of error. In some embodiments, the neutralized prediction model 426 is a generalized linear model. In some embodiments, the neutralized prediction model 426 is a non-linear prediction model, e.g., a prediction model that includes one or more non-linear operations (e.g., a neural-network-based prediction model).

In some embodiments, operational results of the initial prediction model 422 trained using all of the initial training data object 421, the initial prediction model 422 trained with the neutralized training data object 425 alone, and the neutralized prediction model 426 can be described using the per-predictor prediction influence distribution graphs 901-903 of FIGS. 9A-9C. For example, the per-predictor prediction influence distribution graphs 901 of FIG. 9A depicts an exemplary operational context in which each of the predictor variables 601-603 contributes equally to a prediction, while one-fourth of the variations among the initial training data object 421 is deemed noise 914 (i.e., is deemed unexplainable by the initial prediction model 422 due to random and/or non-random factors). This operational context may correspond to operation of an initial prediction model 422 trained using all the initial training data object 421.

Furthermore, the per-predictor prediction influence distribution graphs 902 of FIG. 9B depicts an exemplary context in which predictive contributions of the control predictor variable 603 are removed, but only a portion of those removed contributions are deemed noise 914, while a second portion of the removed contributions are nevertheless captured by the non-control predictor variable 601. This operational context may correspond to operation of an initial prediction model 422 trained with the neutralized training data object 425 alone. According to this operational context, while the control predictor variable 603 no longer contributes to the prediction, the correlations between the control predictor variable 603 and the non-control predictor variable 601 prevent all of the removed prediction contributions of the control predictor variable 603 from being deemed noise 914. Accordingly, because the correlations between the control predictor variable 603 and the non-control predictor variable 601 prevent all of the removed prediction contributions of the control predictor variable 603 from being deemed noise 914, the control predictor variable 603 cannot be deemed to have completely and "cleanly" removed from the trained prediction model.

Moreover, the per-predictor prediction influence distribution graphs 903 of FIG. 9C depicts an exemplary context in which predictive contributions of the control predictor variable 603 are removed and entirely deemed noise 914. This operational context may correspond to operation of the neutralized prediction model 426 trained using the neutralized training data object 425 and the randomized predictions 424. Because the randomized predictions are generated based on the shuffled training data object 423, correlations between the control predictor variable 603 and the non-control predictor variables 601-602 are likely to be sufficiently removed from such predictions. Consequently, because the neutralized prediction model 426 is trained using the randomized predictions as response variables, predictions performed by the neutralized prediction model 426 in accordance with the neutralized training data object 425 are more likely to completely and cleanly remove the predictive contribution of the control predictor variable 603. In this sense, utilizing the neutralized prediction model 426 is a superior approach for isolating and removing effects of particular predictor variables compared to the naïve approach of utilizing initial prediction models 422 trained using neutralized training data objects 425.

Once trained, the neutralized prediction model 426 can be used to perform predictions based on non-control predictor variables alone. In some embodiments, the predictive inference unit 123 is configured to obtain/receive one or more prediction inputs for an inference predictive entity, where each prediction input of the one or more prediction inputs is associated with a control predictor variable and generate neutralized prediction for the inference predictive entity by processing the one or more prediction inputs using the neutralized prediction model 426. In some embodiments, the inference predictive entity corresponds to a driver profile, and the neutralized prediction is a driver risk score prediction for the driver profile. In some embodiments, the predictive inference unit 123 is configured to generate one or more insurance quotes based on the neutralized prediction. In some embodiments, the predictive inference unit 123 is configured to automatically schedule one or more insurance appointments based on the neutralized prediction. In some embodiments, the predictive inference unit 123 is configured to automatically generate one or more insurance promotions based on the neutralized prediction. In some embodiments, at least some of the predictive outputs generated by the predictive inference unit 123 are displayed to an end-user using a predictive output display interface, such as the predictive output display interface 2200 of FIG. 22.

The trained neutralization prediction model 426 can further be used to adjust predictions by a prediction model with an overly expansive input structure. For example, while an initial prediction model 422 may be configured to perform prediction using a group of predictor variables, where at least some of those predictor variables are deemed post-training to be unnecessary, unavailable, and/or predictively disadvantageous. Instead of incurring operational costs of retraining the initial prediction model 422 with an updated input structure, the predictive inference unit 123 can generate an isolated impact score for any unnecessary and/or predictively disadvantageous variables and use the isolated impact score to adjust predictions performed using the initial prediction model 422. In this way, predictions performed by the initial prediction model 422 can be adjusted to accommodate the changing structure of the input structure without retraining the entire model.

In some embodiments, adjusting predictions by a prediction model with an overly expansive input structure may be performed by utilizing predictor neutralization. In some embodiments, adjusting predictions by a prediction model with an overly expansive input structure may be performed by utilizing predictor neutralization may be performed in accordance with the various steps/operations of process 1000 depicted in FIG. 10. As depicted in FIG. 10, the process 1000 begins at step/operation 1001 when the predictive inference unit 123 accesses (e.g., generates and/or provides input to) the initial prediction model 422.

At step/operation 1002, the predictive inference unit 123 generates a neutralized prediction model 426 based on the initial prediction model 422. In some embodiments, to generate the neutralized prediction model 426 based on the initial prediction model 422, the predictive inference unit 123 may utilize the processes depicted in FIGS. 4-5 to isolate and/or remove predictive contributions of one or more control predictor variables from the initial prediction model 422.

At step/operation 1003, the predictive inference unit 123 generates an isolated impact score for the one or more control predictor variables, where the isolated impact score describes an estimated contribution of the one or more control predictor variables to predictions generated by the initial prediction model 422. In some embodiments, to generate the isolated impact score for the control predictor variables, the predictive inference unit 123 determines a deviation measure between a neutralized prediction generated by processing input data extracted from the initial training data object 421 using the neutralized prediction model 426 and a non-neutralized prediction generated by processing input data extracted from the neutralized training data object 425 using the initial prediction model 422. Afterward, the predictive inference unit 123 determines the isolated impact score based on the determined deviation measure between the neutralized prediction and the non-neutralized prediction. This may be because the neutralized prediction is deemed to generate a prediction that incorporates predictive contribution of the control predictor variables, while the non-neutralized prediction is deemed to generate a prediction that a prediction that completely excludes predictive contribution of the control predictor variables.

At step/operation 1004, the predictive inference unit 123 adjusts predictions by the initial prediction model 422 based on the isolated impact score generated in step/operation 1003. In some embodiments, the predictive inference modifies hyper-parameters and/or parameters of the initial prediction model 422 by adding an adjustment layer that adjusts the predictions of the initial prediction model 422. In some embodiments, adjusting predictions by the initial prediction model 422 based on the isolated impact score includes performing an operation (e.g., addition, multiplication, etc.) on the predictions, where at least one operand of the operation is the isolated impact score generated in step/operation 1003. In some embodiments, the adjustment operation may be selected based on a nature of operations performed by one or more layers of the initial prediction model 422. For example, if the initial prediction model 422 is an additive model, the selected adjustment operation may be an addition operation. As another example, if the initial prediction model 422 is a multiplicative model, the selected adjustment operation may be a multiplication operation.

In some embodiments, after modifying hyper-parameters and/or parameters of the initial prediction model 422 by adding an adjustment layer that adjusts the predictions of the initial prediction model 422, the predictive inference unit 123 utilizes the modified initial prediction model 422 to perform predictive inferences. In some embodiments, after modifying hyper-parameters and/or parameters of the initial prediction model 422 by adding an adjustment layer that adjusts the predictions of the initial prediction model 422, the predictive inference unit 123 utilizes both the neutralized prediction model 426 and the modified initial prediction model 422 to perform predictive inferences. For example, the predictive inference unit 123 may utilize an ensemble unit (not depicted) to combine the predictions of the neutralized prediction model 426 and the modified initial prediction model 422 to perform predictive inferences. The ensemble unit may utilize one or more prediction combination operations, such as an averaging operation, a weighted averaging operation utilizing pre-configured weights, a weighted averaging operation utilizing trained weights, a non-linear combination operation using one or more parameters and one or more non-linear operations, etc. In some embodiments, the predictive inference unit 123 may utilize output of the modified initial prediction model 422 to train the neutralized prediction model 426, or vice versa.

FIG. 23 is a flowchart diagram of a process 2300 for generating a neutralized prediction model. As depicted in FIG. 23, to generate the initial prediction model (routine 511), model generation unit 121 uses the initial training data object 421 to generate the initial prediction model 422. In addition, to generate the shuffled training data object (routine 521), the initial training data object 421 is processed by a variable randomization unit 123.1 to generate the shuffled training data object 423. Furthermore, to generate the randomized predictions (routine 512), the shuffled training data object 423 is processed by the initial prediction model 422 to generate the randomized predictions 424. Moreover, to generate the neutralized training data object (routine 513), the initial training data object 421 and the randomized predictions 424 are processed by a neutralized data construction unit 123.2 to generate the neutralized training data object 423. Finally, to generate the neutralized prediction model (routine 522), the model generation unit 121 utilizes the neutralized training data object 423 to generate the neutralized prediction model 436.

FIG. 24 provides an operational example of an example process 2400 for generating a neutralized training data object 425. As depicted in FIG. 24, the initial training data object 421 includes a set of response variables 421.1, a set of predictor variables 421.2 including a set of control variables 421.2.1 and a set of non-control variables 421.2.2, and a set of weight variables 421.3 (that will be assigned weight values during the process of generating the initial prediction model 522).

As further depicted in FIG. 24, the variable randomization unit 123.1 of the variable processing unit 123 is configured to shuffle the set of control variables 421.2.1 in order to generate a set of shuffled control variables 423.2.1 which will be included in the shuffled training data object 423 to replace the set of control variables 421.2.1. Accordingly, the shuffled training data object includes the set of response variables 421.1, a set of updated predictor variables 423.2 including a set of shuffled control variables 423.2.1 and the set of non-control variables 421.2.2, and the set of weight variables 421.3.

As further depicted in FIG. 24, the neutralized data construction unit 123.2 of the variable processing unit 123 is configured to generate the neutralized training data object 425 as a data object that includes: (i) the set of randomized predictions 424 generated based on the shuffled training data object 423 by the initial prediction model 422 to replace the set of response variables 421.1; and (ii) removing the set of shuffled control variables 423.2.1 from the set of updated predictor variables 423.2 to generate a set of neutralized predictor variables 425.2. Accordingly, the neutralized training data object 425 includes the set of randomized predictions 424, the set of neutralized predictor variables 425.2 including the set of non-control variables 421.2.2, and the set of weight variables 421.3.

By utilizing the exemplary predictor neutralization technique described above and the related techniques described herein, various embodiments of the present invention provide predictor neutralization techniques that enable post-training adjustments of prediction models as well as post-training model refinements of prediction models. In doing so, various embodiments of the present invention reduce the need for re-trainings of such prediction models and increase efficiency of re-trainings of trained prediction models. Accordingly, various embodiments of the present invention address technical challenges related to increasing efficiency and utility of predictive data analysis systems by reducing the need for re-trainings of such prediction models and make important technical contributions to improving training efficiency of predictive data analysis models deployed in dynamic predictive domains with changing input structures.

V. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for generating a neutralized prediction model, the computer-implemented method comprising:

generating, by one or more processors, an initial prediction model by training the initial prediction model with an initial training data object, wherein the initial training data object comprises, for each training predictive entity of one or more training predictive entities, one or more control predictor variables, one or more predictor variables, and one or more response variables;

generating, by the one or more processors, a shuffled training data object with a randomized shuffling of the initial training data object, wherein the randomized shuffling of the initial training data object comprises assigning each control predictor variable of the one or more control predictor variables for a first training predictive entity of the one or more training predictive entities to a second training predictive entity of the one or more training predictive entities;

generating, via the one or more processors and for each training predictive entity of the one or more training predictive entities, a randomized prediction with the initial prediction model based at least on the shuffled training data object;

generating, by the one or more processors, a neutralized training data object with a neutralization of the initial training data object, wherein the neutralization of the initial training data object comprises removing each control predictor variable of the one or more control predictor variables for a training predictive entity of the one or more training predictive entities from the initial training data object; and generating, by the one or more processors, the neutralized prediction model based at least in part on the neutralized training data object and each randomized prediction for each training predictive entity of the one or more training predictive entities.

2. The computer-implemented method of claim 1, wherein:

the initial prediction model is configured to perform predictive data analysis in accordance with an initial model input structure characterized by a plurality of predictor variable types, the plurality of predictor variable types comprises one or more control predictor variable types and one or more non-control predictor variable types, each control predictor variable of the one or more control predictor variables for a training predictive entity of the one or more training predictive entities is associated with a control predictor variable type of the one or more control predictor variable types, and each non-control predictor variable of the one or more non-control predictor variables for a training predictive entity of the one or more training predictive entities is associated with a non-control predictor variable type of the one or more non-control predictor variable types.

3. The computer-implemented method of claim 2, further comprising:

receiving one or more prediction inputs for an inference predictive entity, wherein each prediction input of the one or more prediction inputs is associated with a control predictor variable type of the one or more control predictor variable types; and generating a neutralized prediction for the inference predictive entity by processing the one or more prediction inputs using the neutralized prediction model.

4. The computer-implemented method of claim 3, wherein:

the inference predictive entity corresponds to a driver profile, and the neutralized prediction is a driver risk score prediction for the driver profile.

5. The computer-implemented method of claim 2, further comprising:

generating, based at least in part on the neutralized training data object, a neutralized prediction for each training predictive entity of the one or more training predictive entities using the neutralized prediction model;

generating, based at least in part on the initial training data object, a non-neutralized prediction for each training predictive entity of the one or more training predictive entities using the initial prediction model; and generating an isolated impact score for the one or more control predictor variable types by comparing each neutralized prediction for each training predictive entity of the one or more training predictive entities and each non-neutralized prediction for each training predictive entity of the one or more training predictive entities.

6. The computer-implemented method of claim 5, further comprising:

receiving one or more prediction inputs for an inference predictive entity, wherein each prediction input of the one or more prediction inputs is associated with a control predictor variable type of the one or more control predictor variable types;

generating an initial prediction for the inference predictive entity by processing the one or more prediction inputs using the neutralized prediction model; and generating an updated prediction for the inference predictive entity by adjusting an initial predictive entity based at least in part on the isolated impact score.

7. The computer-implemented method of claim 1, further comprising generating the initial prediction model.

8. The computer-implemented method of claim 1, wherein the initial prediction model is a generalized linear model.

9. The computer-implemented method of claim 1, wherein the initial prediction model is a non-linear prediction model.

10. An apparatus for generating a neutralized prediction model, the apparatus comprising at least one processor and at least one memory including a computer program code, the at least one memory and the computer program code configured to, with the at least one processor, cause the apparatus to:

generate an initial prediction model by training the initial prediction model with an initial training data object, wherein the initial training data object comprises, for each training predictive entity of one or more training predictive entities, one or more control predictor variables, one or more predictor variables, and one or more response variables;

generate a shuffled training data object with a randomized shuffling of the initial training data object, wherein the randomized shuffling of the initial training data object comprises assigning each control predictor variable of the one or more control predictor variables for a first training predictive entity of the one or more training predictive entities to a second training predictive entity of the one or more training predictive entities;

generate, for each training predictive entity of the one or more training predictive entities, a randomized prediction the initial prediction model based at least on the shuffled training data object;

generate a neutralized training data object with a neutralization of the initial training data object, wherein the neutralization of the initial training data object comprises removing each control predictor variable of the one or more control predictor variables for a training predictive entity of the one or more training predictive entities from the initial training data object; and generate the neutralized prediction model based at least in part on the neutralized training data object and each randomized prediction for each training predictive entity of the one or more training predictive entities.

11. The apparatus of claim 10, wherein:

the initial prediction model is configured to perform predictive data analysis in accordance with an initial model input structure characterized by a plurality of predictor variable types, the plurality of predictor variable types comprises one or more control predictor variable types and one or more non-control predictor variable types, each control predictor variable of the one or more control predictor variables for a training predictive entity of the one or more training predictive entities is associated with a control predictor variable type of the one or more control predictor variable types, and each non-control predictor variable of the one or more non-control predictor variables for a training predictive entity of the one or more training predictive entities is associated with a non-control predictor variable type of the one or more non-control predictor variable types.

12. The apparatus of claim 11, further comprising:

generating, based at least in part on the neutralized training data object, a neutralized prediction for each training predictive entity of the one or more training predictive entities using the neutralized prediction model;

generating, based at least in part on the initial training data object, a non-neutralized prediction for each training predictive entity of the one or more training predictive entities using the initial prediction model; and generating an isolated impact score for the one or more control predictor variable types by comparing each neutralized prediction for each training predictive entity of the one or more training predictive entities and each non-neutralized prediction for each training predictive entity of the one or more training predictive entities.

13. The apparatus of claim 10, further comprising generating the initial prediction model.

14. The apparatus of claim 10, wherein the initial prediction model is a generalized linear model.

15. The apparatus of claim 10, wherein the initial prediction model is a non-linear prediction model.

16. A non-transitory computer storage medium comprising instructions for generating a neutralized prediction model, the instructions being configured to cause one or more processors to at least perform operations configured to:

generate an initial prediction model by training the initial prediction model with an initial training data object, wherein the initial training data object comprises, for each training predictive entity of one or more training predictive entities, one or more control predictor variables, one or more predictor variables, and one or more response variables;

generate a shuffled training data object with a randomized shuffling of the initial training data object, wherein the randomized shuffling of the initial training data object comprises assigning each control predictor variable of the one or more control predictor variables for a first training predictive entity of the one or more training predictive entities to a second training predictive entity of the one or more training predictive entities;

generate, for each training predictive entity of the one or more training predictive entities, a randomized prediction the initial prediction model based at least on the shuffled training data object;

generate a neutralized training data object with a neutralization of the initial training data object, wherein the neutralization of the initial training data object comprises removing each control predictor variable of the one or more control predictor variables for a training predictive entity of the one or more training predictive entities from the initial training data object; and generate the neutralized prediction model based at least in part on the neutralized training data object and each randomized prediction for each training predictive entity of the one or more training predictive entities.

17. The non-transitory computer storage medium of claim 16, wherein:

the initial prediction model is configured to perform predictive data analysis in accordance with an initial model input structure characterized by a plurality of predictor variable types, the plurality of predictor variable types comprises one or more control predictor variable types and one or more non-control predictor variable types, each control predictor variable of the one or more control predictor variables for a training predictive entity of the one or more training predictive entities is associated with a control predictor variable type of the one or more control predictor variable types, and each non-control predictor variable of the one or more non-control predictor variables for a training predictive entity of the one or more training predictive entities is associated with a non-control predictor variable type of the one or more non-control predictor variable types.

18. The non-transitory computer storage medium of claim 17, further comprising:

generating, based at least in part on the neutralized training data object, a neutralized prediction for each training predictive entity of the one or more training predictive entities using the neutralized prediction model;

generating, based at least in part on the initial training data object, a non-neutralized prediction for each training predictive entity of the one or more training predictive entities using the initial prediction model; and generating an isolated impact score for the one or more control predictor variable types by comparing each neutralized prediction for each training predictive entity of the one or more training predictive entities and each non-neutralized prediction for each training predictive entity of the one or more training predictive entities.

19. The non-transitory computer storage medium of claim 16, further comprising generating the initial prediction model.

20. The non-transitory computer storage medium of claim 16, wherein the initial prediction model is a generalized linear model.

* * * * *